US011214228B2

(12) United States Patent
Suzuki et al.

(10) Patent No.: US 11,214,228 B2
(45) Date of Patent: Jan. 4, 2022

(54) AIRBAG DEVICE

(71) Applicant: TOYODA GOSEI CO., LTD., Kiyosu (JP)

(72) Inventors: Keita Suzuki, Nagoya (JP); Takuya Hiraiwa, Kiyosu (JP); Shinichi Ishida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 6 days.

(21) Appl. No.: 16/924,426

(22) Filed: Jul. 9, 2020

(65) Prior Publication Data

US 2021/0031720 A1 Feb. 4, 2021

(30) Foreign Application Priority Data

Jul. 30, 2019 (JP) .............................. JP2019-140318

(51) Int. Cl.
*B60R 21/239* (2006.01)
*B60R 21/237* (2006.01)
*B60R 21/231* (2011.01)
*B60R 21/2338* (2011.01)
*B60R 21/215* (2011.01)

(52) U.S. Cl.
CPC .......... *B60R 21/237* (2013.01); *B60R 21/231* (2013.01); *B60R 21/239* (2013.01); *B60R 21/2338* (2013.01); *B60R 2021/21518* (2013.01); *B60R 2021/2395* (2013.01); *B60R 2021/23384* (2013.01)

(58) Field of Classification Search
CPC ........... B60R 2021/23388; B60R 2021/23386; B60R 2021/23384; B60R 2021/23382; B60R 21/2338; B60R 2021/2395; B60R 21/239
See application file for complete search history.

(56) References Cited

U.S. PATENT DOCUMENTS

| 2006/0071461 A1* | 4/2006 | Williams ............... B60R 21/239 |
| | | 280/739 |
| 2017/0072897 A1* | 3/2017 | Kruse ................... B60R 21/203 |
| 2019/0001916 A1* | 1/2019 | Jo ......................... B60R 21/207 |
| 2019/0061670 A1* | 2/2019 | Jang ..................... B60R 21/233 |

(Continued)

FOREIGN PATENT DOCUMENTS

| DE | 202020106413 U1 * | 11/2020 | ........... B60R 21/239 |
| FR | 2724144 A1 * | 3/1996 | ........... B60R 21/235 |

(Continued)

*Primary Examiner* — Paul N Dickson
*Assistant Examiner* — Maxwell L Meshaka
(74) *Attorney, Agent, or Firm* — Posz Law Group, PLC

(57) ABSTRACT

An airbag device includes an airbag formed with a discharge portion. The discharge portion includes: an opening portion; a tack portion around the opening portion; and a regulating belt portion disposed on a peripheral edge of the opening portion to regulate opening and closing of the opening portion. When the inflation of the airbag is completed, the tack portion is maintained in a folded state by the regulating belt portion due to tension acting on the regulation belt portion, so that a closed state of the opening portion is capable of being maintained, and when the tension does not act on the regulating belt portion, the folded state is released and the opening portion is brought into an open state.

6 Claims, 16 Drawing Sheets

(56) References Cited

U.S. PATENT DOCUMENTS

| | | | |
|---|---|---|---|
| 2019/0256034 A1* | 8/2019 | Saito | B60R 21/239 |
| 2020/0079313 A1* | 3/2020 | Hiraiwa | B60R 21/235 |
| 2021/0094498 A1* | 4/2021 | Takahashi | B60R 21/2338 |

FOREIGN PATENT DOCUMENTS

| | | | |
|---|---|---|---|
| JP | 2017-177845 A | | 10/2017 |
| KR | 20140035140 A | * | 3/2014 |

* cited by examiner

AIRBAG DEVICE

CROSS-REFERENCE TO RELATED APPLICATIONS

This application is based upon and claims the benefit of priority from prior Japanese patent application No. 2019-140318, filed on Jul. 30, 2019, the entire contents of which are incorporated herein by reference.

TECHNICAL FIELD

The present invention relates to an airbag device that includes an airbag folded and stored in a storage part, configured to inflate so as to protrude from the storage part by allowing inflation gas to flow inside, and including a discharge portion capable of discharging a part of the inflation gas flowing into the airbag.

BACKGROUND ART

In the related art, in an airbag including a discharge portion capable of discharging a part of inflation gas flowing inside, the discharge portion includes an opening portion formed by cutting out a base material in a region of a tack portion provided so as to form a fold on the base material forming the airbag, and two regulating belt portions extending from both sides of the opening portion. The regulating belt portion has a tip end side connected to the airbag, and unfold the fold of the tack portion and opens the opening portion when receiving an occupant and relaxing (for example, see JP-A-2017-177845).

However, in the related-art airbag, the regulating belt portions are disposed on both sides of the opening portion, and a region of a base portion side connected to the tack portion is disposed on an outer surface side of the airbag, a tip end is away from the base portion side, separated from the tack portion, and connected to a location closer to a center side of the airbag than the tack portion region. When tension is generated in the regulating belt portion at the time of completion of the inflation of the airbag, the regulating belt portion behaves in a manner of pulling inward the fold part disposed on an inner peripheral surface side of the airbag in the tack portion. Therefore, in the related-art airbag device, even if the tack portion receives the internal pressure of the inflation gas flowing inside, a part disposed in the middle is pulled by the regulating belt portion and behaves as if being peeled off from a part disposed on an outer peripheral surface side. There is room for improvement in that the opening portion is stably closed by the tack portion.

The present invention solves the above-described problem, and an object thereof is to provide an airbag device capable of accurately controlling an internal pressure of an airbag when inflation is completed by a discharge portion.

SUMMARY OF INVENTION

According to an aspect of the invention, there is provided an airbag device comprising: an airbag folded and stored in a storage part, configured to inflate so as to protrude from the storage part by allowing inflation gas to flow inside, the airbag formed with a discharge portion capable of discharging a part of the inflation gas flowing into the airbag, wherein the discharge portion includes: an opening portion formed by cutting out a base material forming the airbag; a tack portion provided on the base material around the opening portion; and a regulating belt portion separated from the airbag and disposed on a peripheral edge of the opening portion to regulate opening and closing of the opening portion, the tack portion is formed by making a fold on the base material from a state where the base material is flatly unfolded so as to reduce an opening area of an opening on the opening portion, the tack portion is formed by folding the base material by an outer fold and an inner fold that which are formed substantially in parallel, such that an inner region, an intermediate region, and an outer region are stacked, a base end side of the regulating belt portion is coupled to an outer region side, the regulating belt portion is disposed to be substantially orthogonal to the outer fold and the inner fold, and a tip end side inserted into the airbag is connected to a side of the airbag which is further away from a part coupled to the base end in a state where the regulating belt portion is in an inverted state so as to surround the tack portion such that the regulating belt portion is inserted into an insertion hole formed on a part of the base material disposed continuously from the inner region, and when the inflation of the airbag is completed, the tack portion is maintained in a folded state by the regulating belt portion due to tension acting on the regulation belt portion, so that a closed state of the opening portion is capable of being maintained, and when the tension does not act on the regulating belt portion, the folded state is released and the opening portion is brought into an open state.

DESCRIPTION OF EMBODIMENTS

Figure 1:
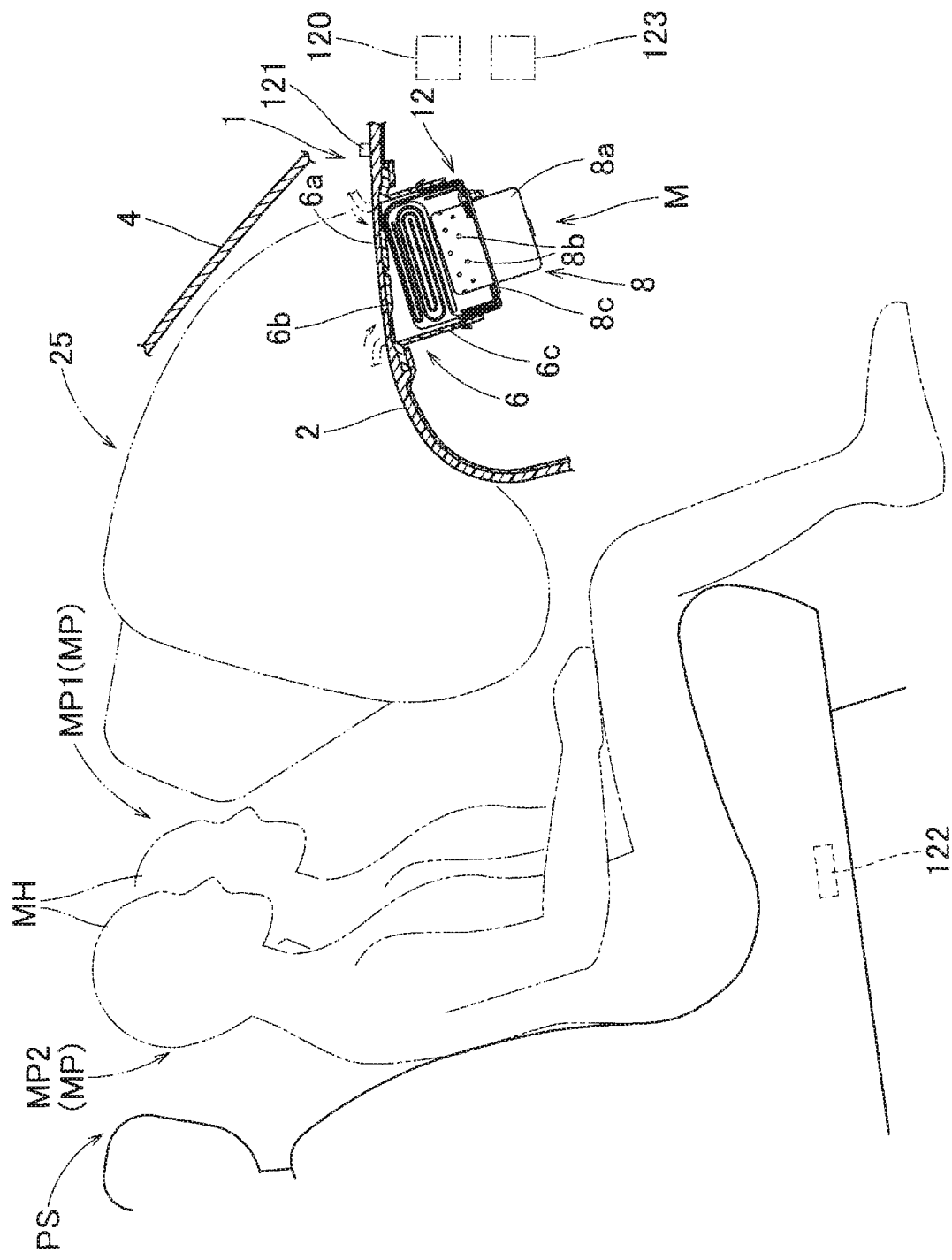
FIG. 1 is a schematic view showing the vicinity where an airbag device for a passenger seat according to an embodiment of the present invention is mounted.
Figure 2:
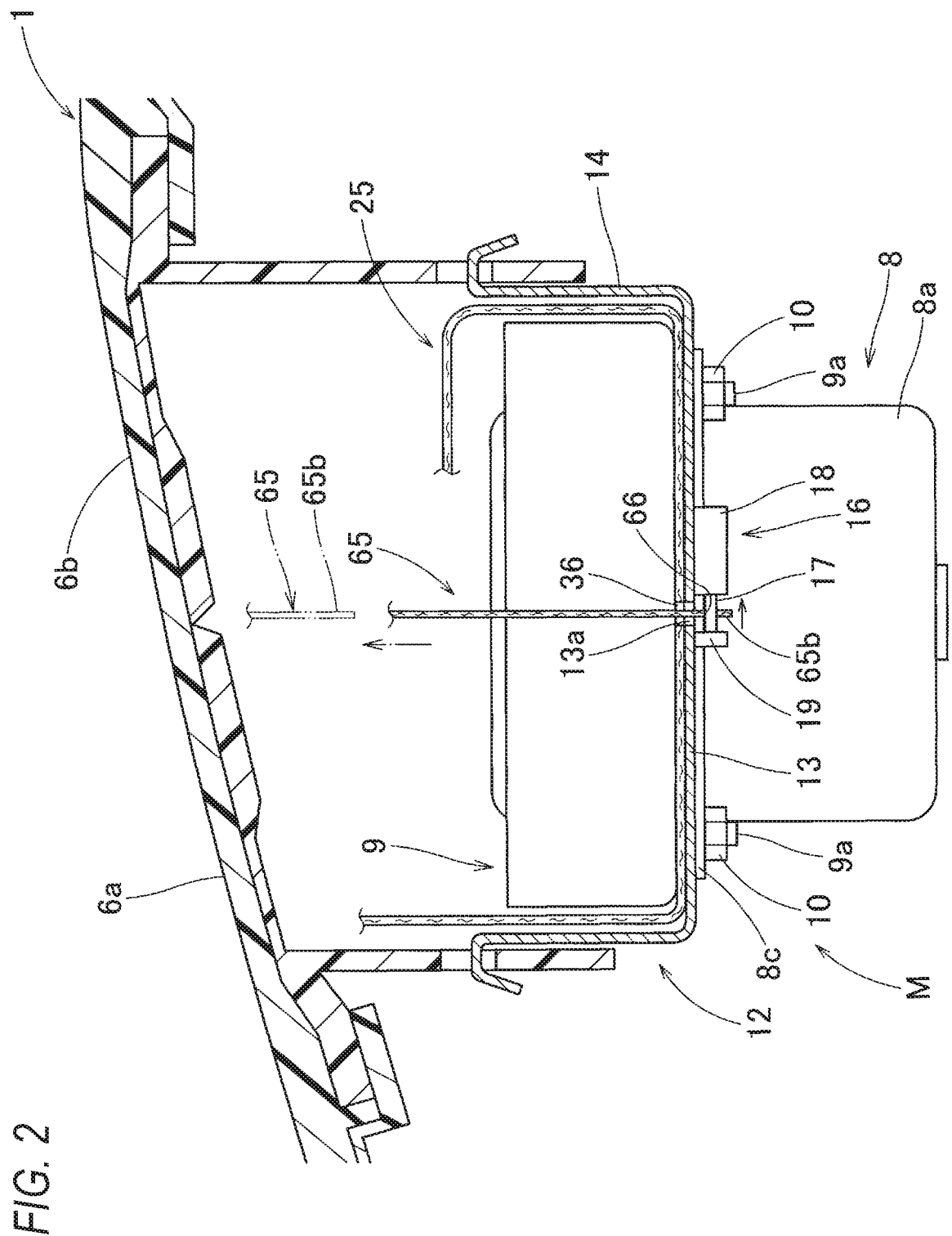
FIG. 2 is a schematic enlarged sectional view of the airbag device according to the embodiment along a front-rear direction.
Figure 12:
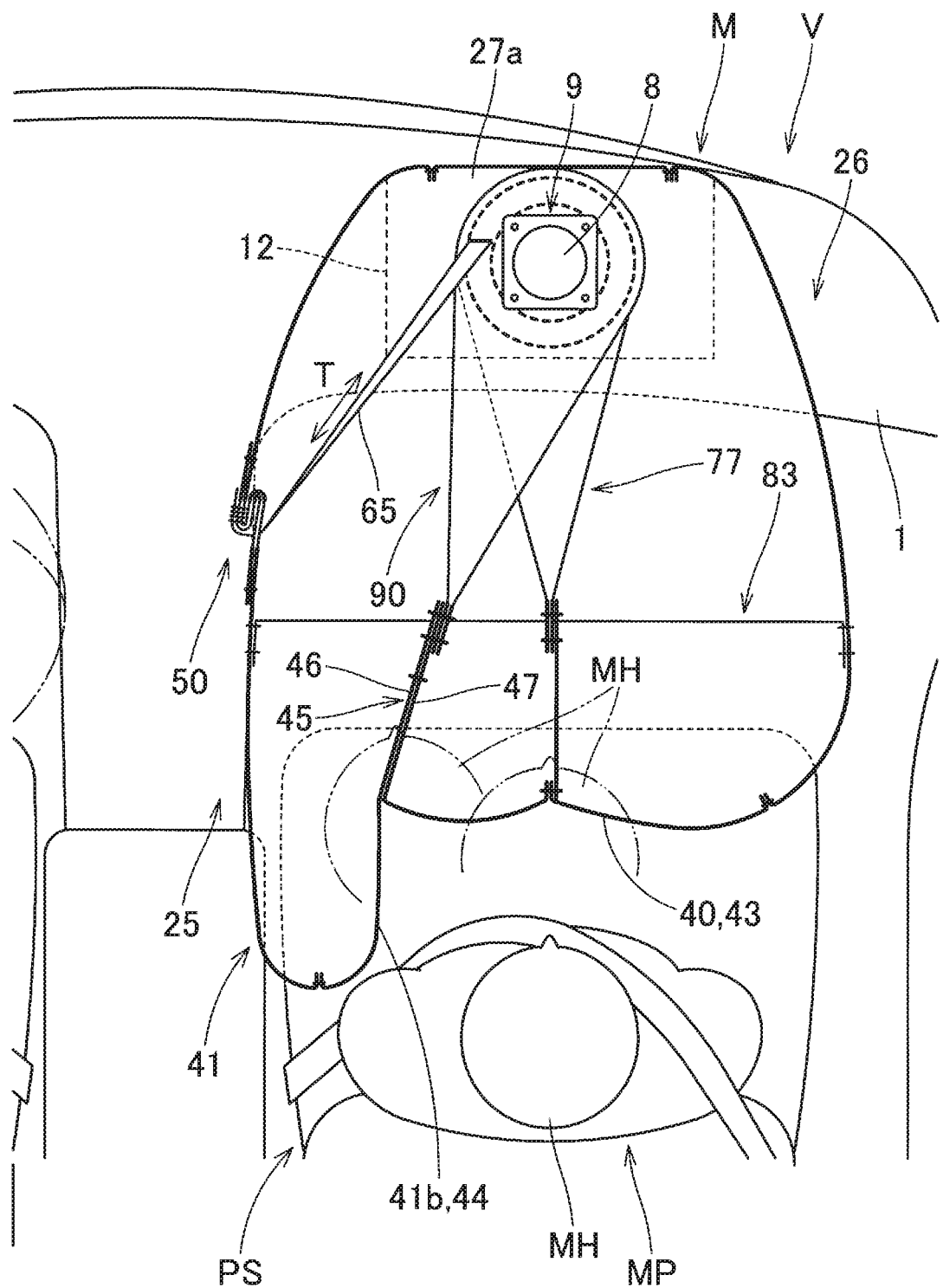
FIG. 12 is a schematic cross-sectional view showing state where the airbag is completely inflated in the airbag device according to the embodiment.

Hereinafter, an embodiment of the present invention will be described with reference to the drawings. In the embodiment, an airbag device for a passenger seat will be described as an example of an airbag device. As shown in FIGS. 1, 2 and 12, an airbag device M for a passenger seat (hereinafter, referred to as "airbag device") includes a folded airbag 25, an inflator 8 supplying inflation gas to the airbag 25, a case 12 as a storage part storing and holding the airbag 25 and the inflator 8, a retainer 9 for attaching the airbag 25 and the inflator 8 to the case 12, an airbag cover 6 covering the folded airbag 25, and a locking member 16 locking tip ends 65b of regulating belt portions 65 that form a discharge portion 50 formed in the airbag 25. In the case of the embodiment, operations of the inflator 8 and the locking member 16 are controlled by a control device 120 shown in FIG. 1.

As shown in FIG. 1, the control device 120 operates the inflator 8 by inputting electric signals from a position detection sensor 121 capable of detecting the physique of an occupant MP sitting on a passenger seat PS, a separation distance between an instrument panel 1 and the occupant MP, a weight detection sensor 122 capable of detecting the weight of the occupant MP and a collision detection sensor 123 capable of detecting an acceleration and a direction of acceleration of a vehicle V and the like, and controls the operation of the locking member 16 such that the airbag 25 is inflated in a suitable inflation mode.

The airbag cover 6 is integrally formed with the instrument panel 1 made of synthetic resin, and includes two door portions 6a, 6b which are opened by being pushed by the airbag 25 when the airbag 25 is unfolded and inflated. A connecting wall portion 6c connected to a peripheral wall portion 14 of the case 12 is formed around the door portions 6a, 6b in the airbag cover 6.

As shown in FIGS. 1 and 2, the inflator 8 includes a substantially cylindrical body portion 8a including a plurality of gas discharge ports 8b, and a flange portion 8c for attaching the inflator 8 to the case 12. In the embodiment, the inflator 8 is controlled in operation by the control device 120 so as to operate in a frontal collision, an oblique collision, and an offset collision of the vehicle V.

The case 12 as a storage part is formed in a substantially rectangular parallelepiped shape made of a sheet metal which has a rectangular opening on an upper end side of the case 12, and includes a substantially rectangular bottom wall portion 13 to which the inflator 8 is inserted and attached from below and peripheral wall portions 14 which extend upward from an outer peripheral edge of the bottom wall portion 13 to lock the connecting wall portion 6c of the airbag cover 6. In the embodiment, the airbag 25 and the inflator 8 are connected to the bottom wall portion 13 of the case 12 by causing bolts 9a of the retainer 9 disposed in the airbag 25 as attachment units to pass through a peripheral edge of an inflow opening 34 in the airbag 25, the bottom wall portion 13 of the case 12 and the flange portion 8c of the inflator 8 and fastening the bolts 9a with nuts 10. Specifically, the case 12 is configured to be wide in a left-right direction (see FIG. 12), and an insertion hole into which the body portion 8a of the inflator 8 can be inserted and insertion holes for inserting the bolls 9a of the retainer 9 are disposed at positions approximately at the center of the bottom wall portion 13 in the left-right direction (reference numerals are omitted). Further, in the bottom wall portion 13, a through hole 13a into which a tip end 65b side of the regulating belt portion 65 described below can be inserted is formed on a left side of the insertion hole for inserting the body portion 8a of the inflator 8 (see FIG. 2). The case 12 is connected to a body side of the vehicle V by a bracket (not shown) formed on the bottom wall portion 13.

In the embodiment, the locking member 16 locking the tip end 65h side of the regulating belt portion 65 is disposed at a position below the bottom wall portion 13 of the case 12 and near the through hole 13a (specifically, on a left side of the inflator 8). As shown in FIG. 2, the locking member 16 includes a locking pin 17 inserted into a locking hole 66 which is formed on the tip end 65b side of the regulating belt portion 65 and locks the tip end 65b side of the regulating belt portion 65, an actuator 18 attached to a lower surface side of the bottom wall portion 13 and operating so as to be capable of pulling in the locking pin 17, and a support bracket 19 configured to extend downward from the bottom wall portion 13 at a tip end side of the locking pin 17 and capable of supporting the tip end side of the locking pin 17. The actuator 18 is configured to operate so as to pull in the locking pin 17 by receiving an operation signal from the control device 120. When the actuator 18 operates to pull in the locking pin 17, the locking pin 17 shifts from a state of locking the tip end 65b side of the regulating belt portion 65 to a state in which the locking is released, and the regulating belt portion 65 moves (see two-dot chain line in FIG. 2). If the actuator 18 can move the locking pin 17 by an electric signal from the control device 120, a piston cylinder utilizing fluid pressures including a case where hydraulic pressure, water pressure, pneumatic pressure, or gas pressure for inflating the inflator and the like are generated, a motor utilizing the fluid pressures or electricity, an electromagnetic solenoid, a spring utilizing an urging force at the time of restoration, and the like can be used. When the actuator 18 is not in operation, the tip end side of the locking pin 17 is supported by the support bracket 19 so as to prevent a part on the tip end 65b side of the regulating belt portion 65 from being pulled out of the locking pin 17 during locking.

As shown in FIGS. 3 to 7, the airbag 25 includes a bag body 26, a rectifying cloth 74 disposed inside the bag body 26, tethers 77, 83, 84, 90 disposed inside the bag body 26 and regulate an inflation completed shape of the bag body 26, and the regulating belt portions 65 extending from the discharge portion 50 in the bag body 26.

The bag body 26 has a bag shape formed of a flexible sheet, and in the case of the embodiment, as shown in FIGS. 3 to 7, the bag body 26 includes a body inflation portion 27 and a protruding inflation portion 41 disposed so as to partially protrude from a rear surface side of the body inflation portion 27 when the inflation is completed. The protruding inflation portion 41 is disposed on a left end side when the inflation of the body inflation portion 27 is completed.

Since the body inflation portion 27 is disposed to fill a space between an upper surface 2 of the instrument panel 1 and the windshield 4 above the instrument panel 1 when the inflation is completed, the shape at the time of completion of the inflation is a substantially quadrangular pyramid shape converging toward a front end side. The body inflation portion 27 includes a rear side wall portion 40 disposed on the rear surface side which is an occupant MP side at the time of completion of the inflation, and a tapered peripheral wall portion 28 extending forward from a peripheral edge of the rear side wall portion 40 and converging toward the front end side. In the airbag 25 according the embodiment, the body inflation portion 27 is substantially symmetrical.

The peripheral wall portion 28 is a part disposed mainly between the instrument panel 1 and the windshield 4 above the instrument panel 1 when the inflation of the airbag 25 is completed, and includes an upper wall portion 29 and a lower wall portion 30 which are disposed to face each other in an upper-lower direction, and a left wall portion 31 and a right wall portion 32 which are disposed to face each other in the left-right direction. On the lower surface side (lower wall portion 30 side) on a front end side of the peripheral wall portion 28 (front end 27a side of the body inflation portion 27), an inflow opening 34 formed to be opened in a substantially circular shape to make the inflation gas flow therein, and a plurality of (in the case of the embodiment, four) mounting holes 35 for inserting the bolts 9a of the retainer 9 at the periphery edge of the inflow opening 34 are formed. On a left side of the inflow opening 34, a slit-shaped insertion hole 36 into which the tip end 65b of the regulating belt portion 65 extending from the discharge portion 50 can be inserted is formed substantially along the left-right direction. Further, in the bag body 26 according to the embodiment, the left wall portion 31 of the peripheral wall portion 28 is formed with the discharge portion 50 capable of discharging a part, of the inflation gas flowing inside. In the case of the embodiment, an opening portion 51 described below in the discharge portion 50 has an opening as a small open state even in a closed state, and an opening portion 51S in the small open state functions as a vent hole for exhausting excess inflation gas flowing inside. A vent hole 37 for exhausting the excess inflation gas flowing inside is formed to open in a substantially circular shape on the right wall portion 32. In the case of the embodiment, the opening portion 51 formed on the left wall portion 31 and the vent hole 37 formed on the right wall portion 32 are configured such that the disposition positions substantially match when viewed from the left-right direction, and are disposed at positions behind the center in the front-rear direction and slightly above the center in the upper-lower direction when viewed from the left-right direction. Further, an opening area of the vent hole 37 is configured to be substantially the same as an opening area of the opening portion 51S in the small open state.

The rear side wall portion 40 is disposed so as to be substantially along the upper-lower direction on a rear surface side which is the occupant MP side when the inflation of the airbag 25 is completed, and the protruding inflation portion 41 which protrudes so as to partially protrude rearward is disposed at a part on one end side in the left-right direction (in the case of the embodiment, a left end side which is a driver's seat side). In the rear side wall portion 40, a region disposed on a right side of the protruding inflation portion 41 constitutes a front collision restraint surface 43 capable of protecting a head MH of the occupant MP moving forward during the front collision of the vehicle V.

Figure 7:
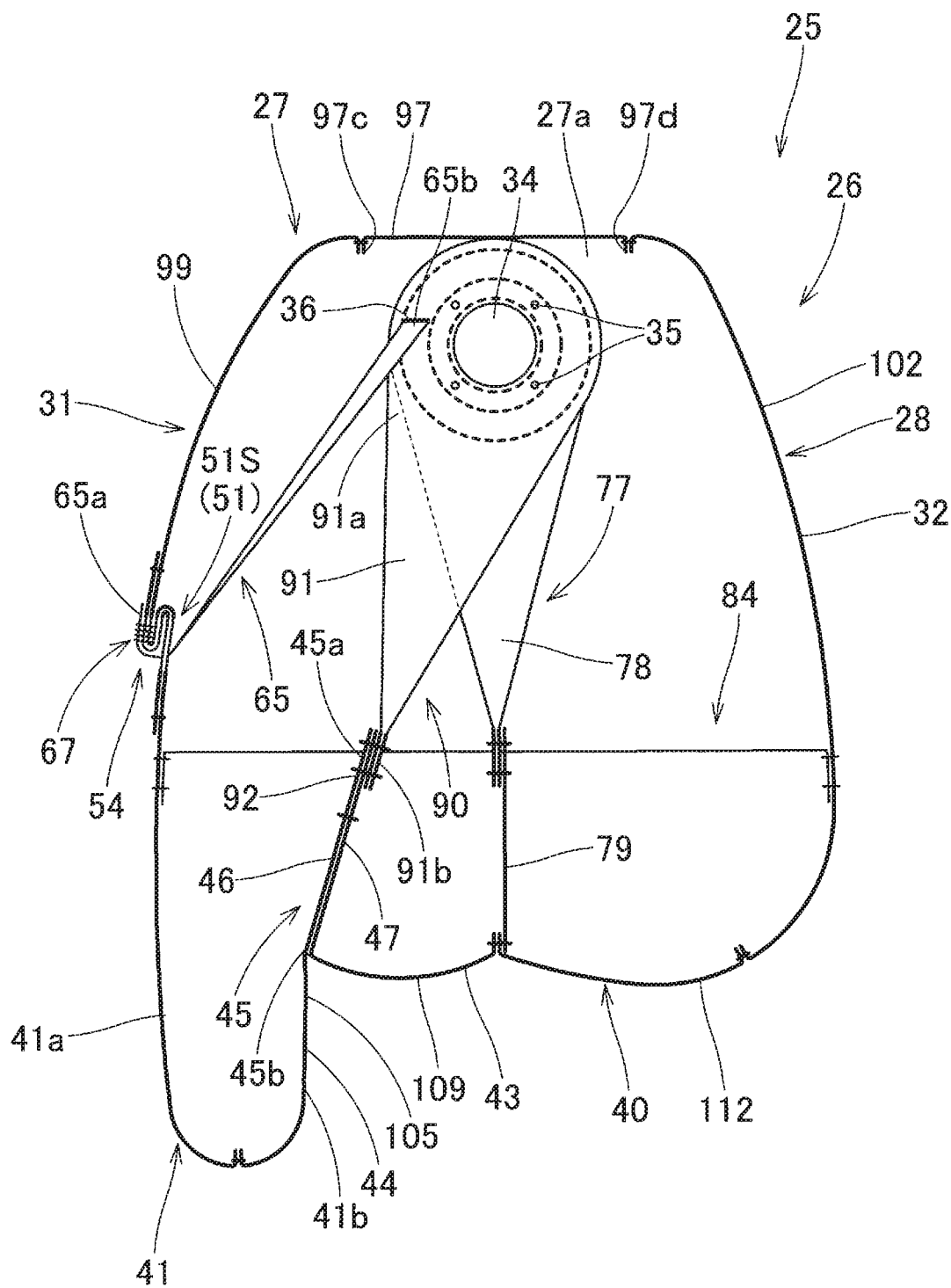
FIG. 7 is a schematic cross-sectional view of the airbag in FIG. 3.

The protruding inflation portion 41 is disposed in an upper region on an rear surface side of the body inflation portion 27 at the time of the completion of inflation, and is disposed at a left-oblique front side of the occupant MP sitting on the passenger seat PS when the inflation of the airbag 25 is completed (see FIG. 12). The protruding inflation portion 41 is configured to inflate by flowing an inflation gas into the inside through a front end side communicated with the body inflation portion 27, the outer shape at the time of completion of the inflation is a substantially plate-shaped shape disposed such that a thickness direction thereof extends along the left-right direction, and is a substantially trapezoidal shape having a narrow width toward the rear end side when viewed from the left-right direction. The protruding inflation portion 41 includes a left wall portion 41a and a right wall portion 41b which are arranged to face each other on the left and right sides when the inflation is completed, and as shown in FIG. 7, the left wall portion 41a is configured to be connected to the left wall portion 31 of the peripheral wall portion 28 in the body inflation portion 27. In the protruding inflation portion 41, the right wall portion 41b constitutes an oblique collision restraint surface 44 capable of protecting the head MH of the occupant MP that moves diagonally forward at the time of an oblique collision or an offset collision of the vehicle V. The external dimension of the protruding inflation portion 41 (width direction in the upper-lower direction and width direction in the front-rear direction (protruding amount from the rear side wall portion 40)) is set to a size that can accurately receive the head MH of the occupant MP and smoothly guide the head MH to a restraining recess 45 described below when the inflation of the airbag 25 is completed and comes into contact with the head MH of the occupant MP moving diagonally forward by the right wall portion 41b (oblique collision restraint surface 44).

Figure 6:
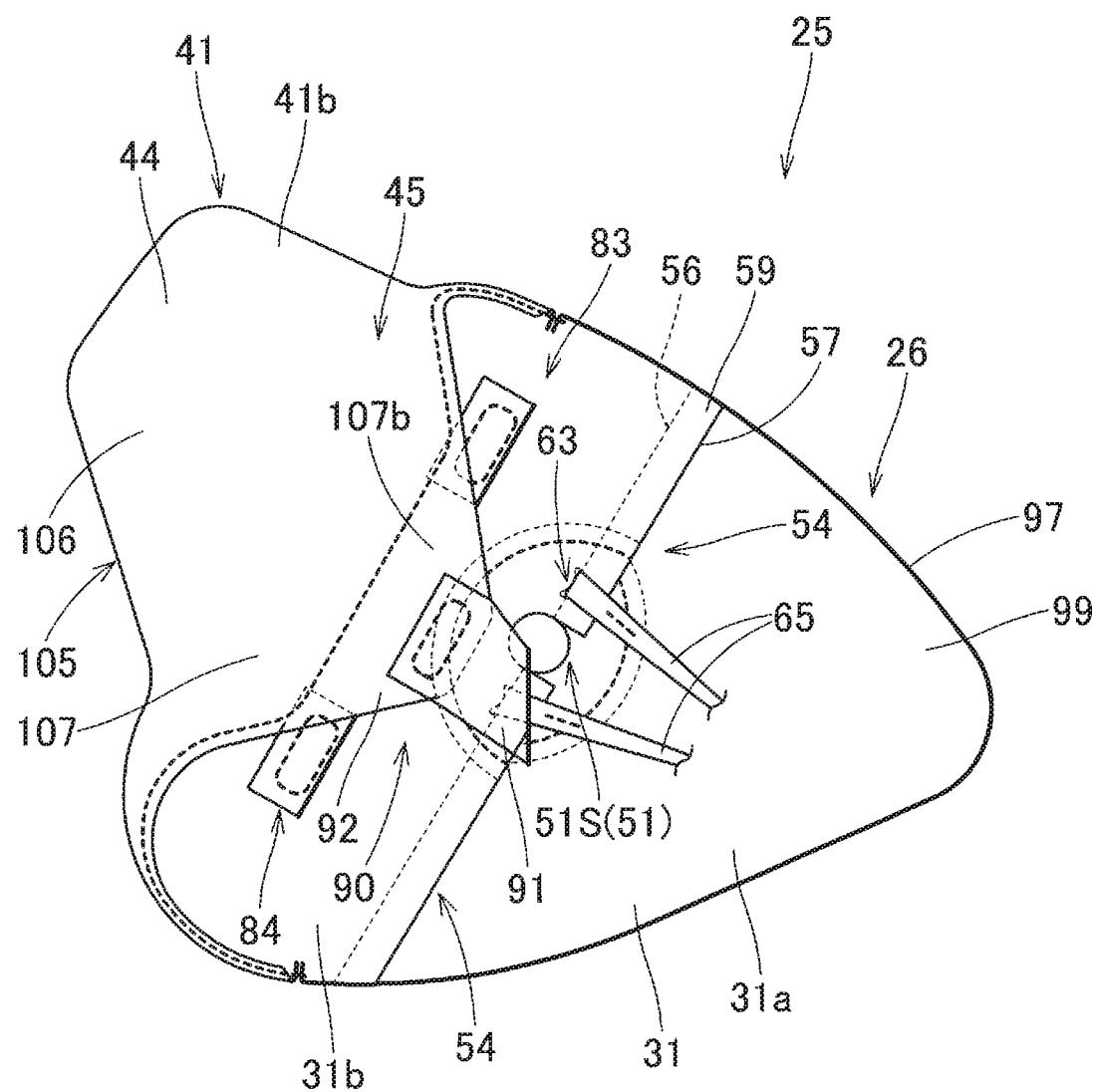
FIG. 6 is a schematic longitudinal sectional view of the airbag in FIG. 3, and a sectional view at a part of a restraining recess.

In the airbag 25 according to the embodiment, the restraining recess 45 is formed at a boundary between the protruding inflation portion 41 and the rear side wall portion 40 (between the front collision restraint surface 43 and the oblique collision restraint surface 44) to allow the head MH of the occupant MP moving diagonally forward to enter and to be restrained. The restraining recess 45 is formed so as to extend substantially in the upper-lower direction at the boundary between the region on the right side of the protruding inflation portion 41 and the rear side wall portion 40 of the body inflation portion 27, and as shown in FIGS. 6 and 7, the restraining recess 45 has a configuration in which the rear end 45b side is opened and recessed forward like a pocket. The restraining recess 45 is widened up and down as viewed from the left-right direction, and the outer peripheral edges of a left wall portion 46 and a right wall portion 47 having a substantially trapezoidal shape, which are slightly narrower toward the front end 45a, are continuously coupled (sewed) to each other except for the rear edge side. In the case of the embodiment, the restraining recess 45 has a length dimension (opening width dimension) in the upper-lower direction of the part on the rear end 45b side larger than a width dimension in the upper-lower direction of the part on a front end side of the protruding inflation portion 41, and the restraining recess 45 is formed so as to extend below the protruding inflation portion 41 (see FIG. 6).

Further, in the airbag 25 according to the embodiment, the recessed tip end (front end 45a) side of the restraining recess 45 is connected to a tether 90 for a recess disposed in the bag body 26, and when the inflation of the airbag 25 is completed, the restraining recess 45 is disposed in a state where the recessed tip end (front end 45a) side is pulled forward by the tether 90 for a recess (see FIG. 7). In the case of the embodiment, when the inflation of the airbag 25 is completed, the restraining recess 45 is connected to the right wall portion 41b of the protruding inflation portion 41 such that the left wall portion 46 and the right wall portion 47 are in contact with each other over substantially the entire area, and is disposed slightly inclined with respect to the front-rear direction such that the front end 45a is directed rightward.

The discharge portion 50 provided in the left wall portion 31 includes the opening portion 51 formed by cutting out a left panel portion 99 described below as a base material forming the airbag 25, a tack portion 54 provided on the left panel portion 99 around the opening portion 51, and the regulating belt portions 65 separated from the bag body 26 (the airbag 25) and disposed on a peripheral edge of the opening portion 51 to regulate opening and closing of the opening portion 51.

Figure 10:
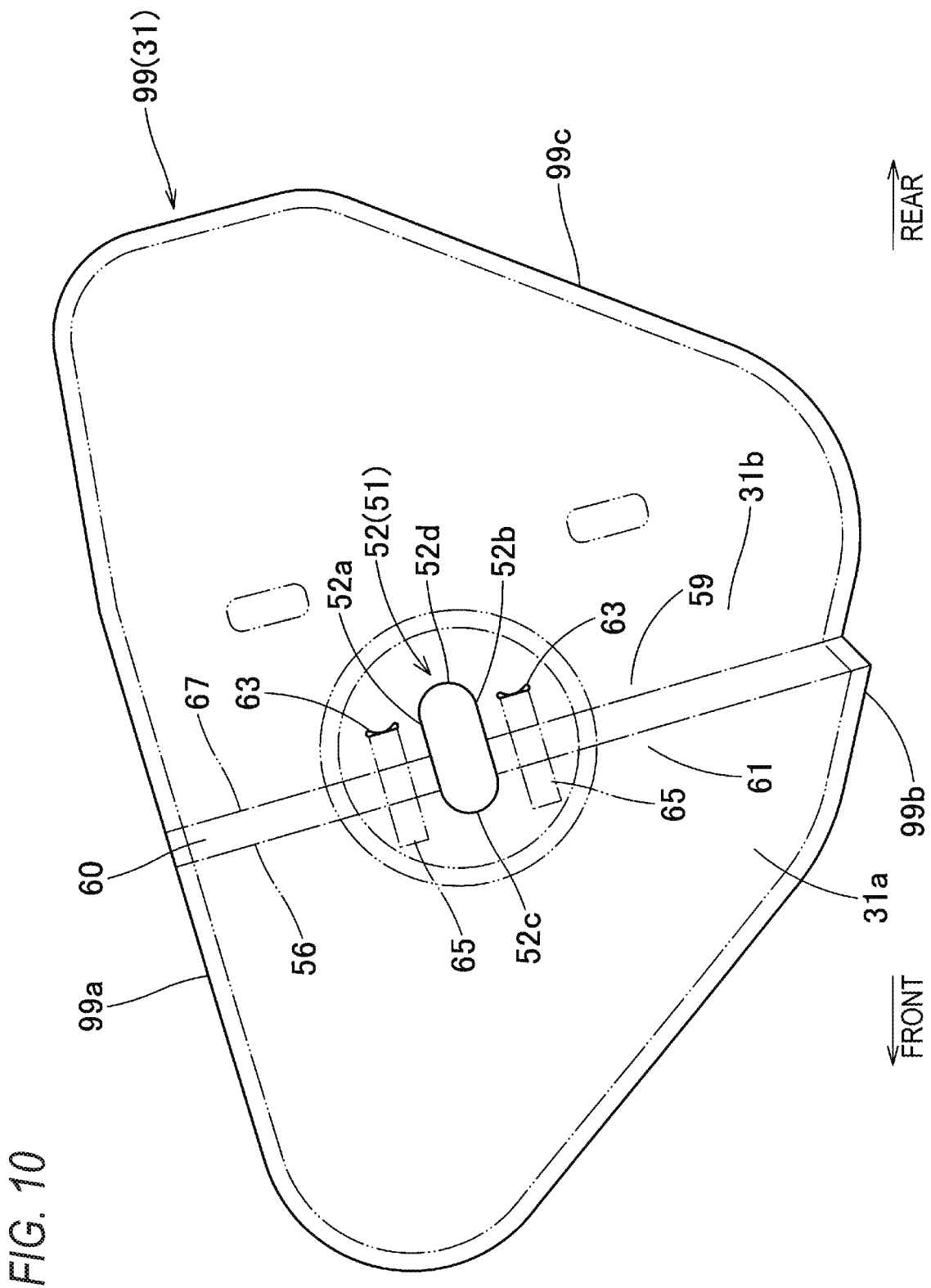
FIG. 10 is an enlarged plan view of a left panel portion.

As shown in FIG. 10, the opening portion 51 includes an opening forming portion 52 formed in a substantially elliptical shape which is wide in the front-rear direction when the left panel portion 99 is in a flatly unfolded state. In detail, the opening shape of the opening forming portion 52 is substantially semicircular such that an upper edge 52a and a lower edge 52b are substantially parallel straight lines, and a front edge 52c and a rear edge 52d protrude in directions away from each other in the front-rear direction.

Figure 3:
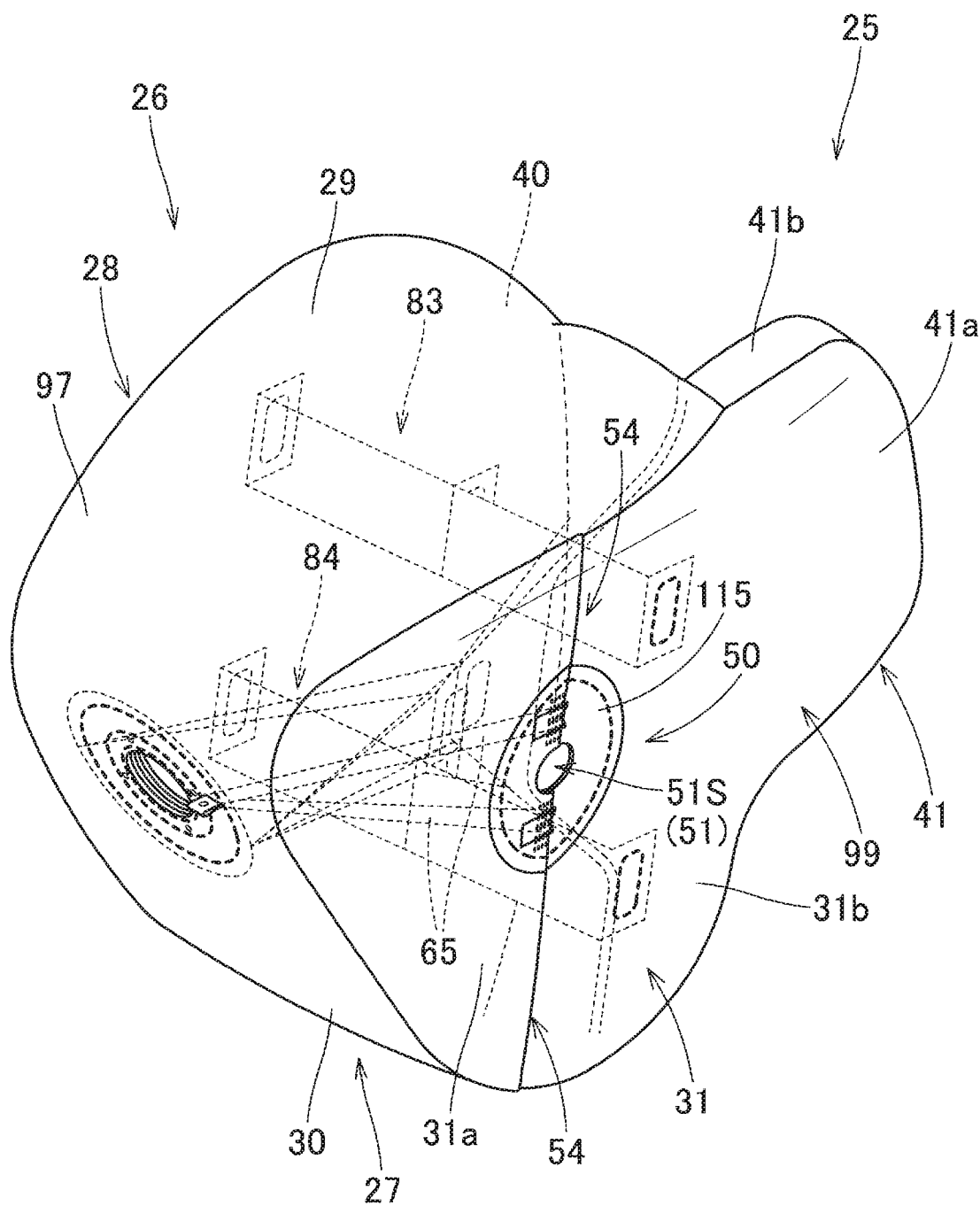
FIG. 3 is a schematic perspective view of an airbag used in the airbag device according to the embodiment in a state of being inflated alone as viewed from a front left side.
Figure 4:
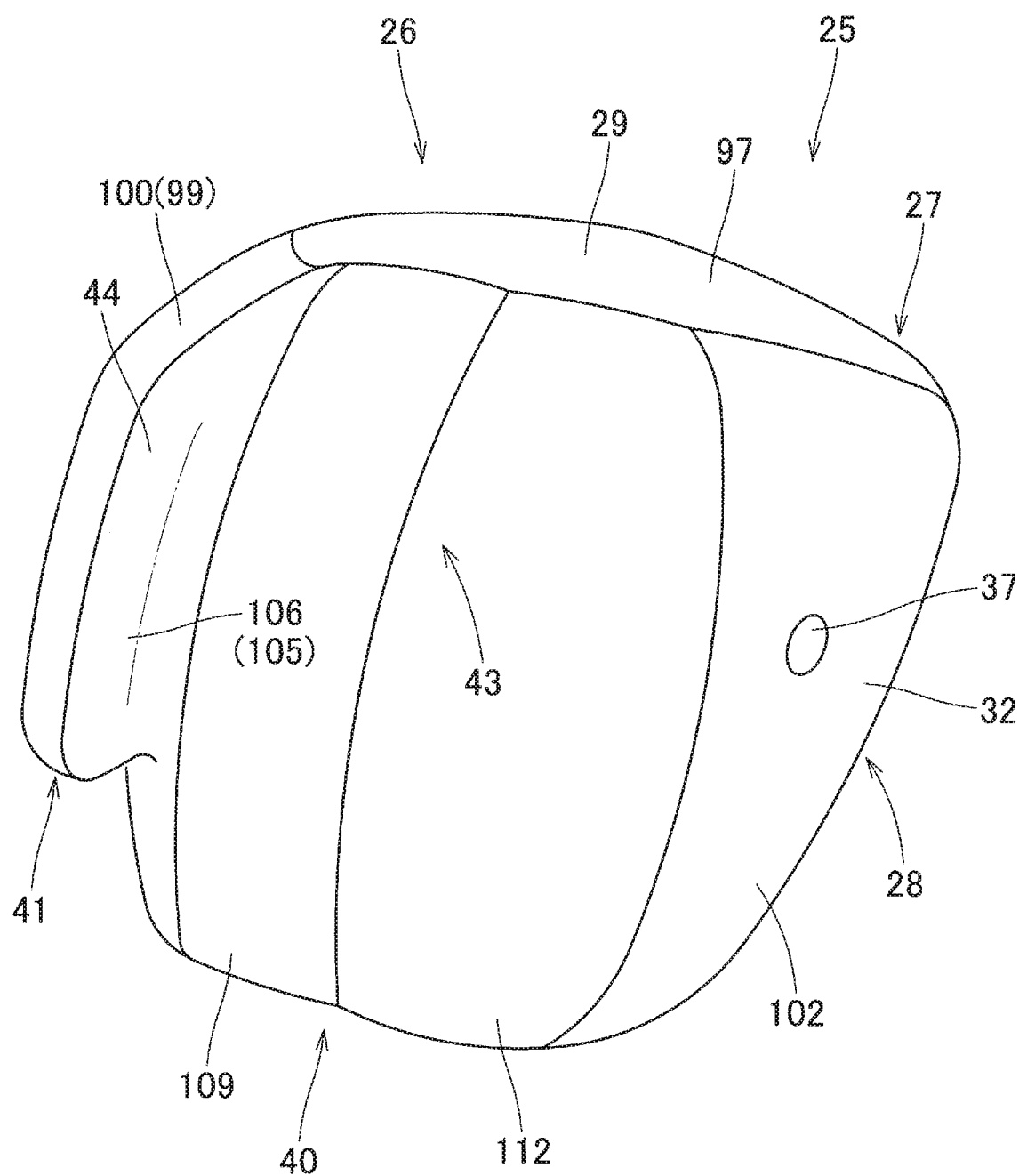
FIG. 4 is a schematic perspective sectional view of the airbag in FIG. 3 as viewed from a rear right side.
Figure 11A:
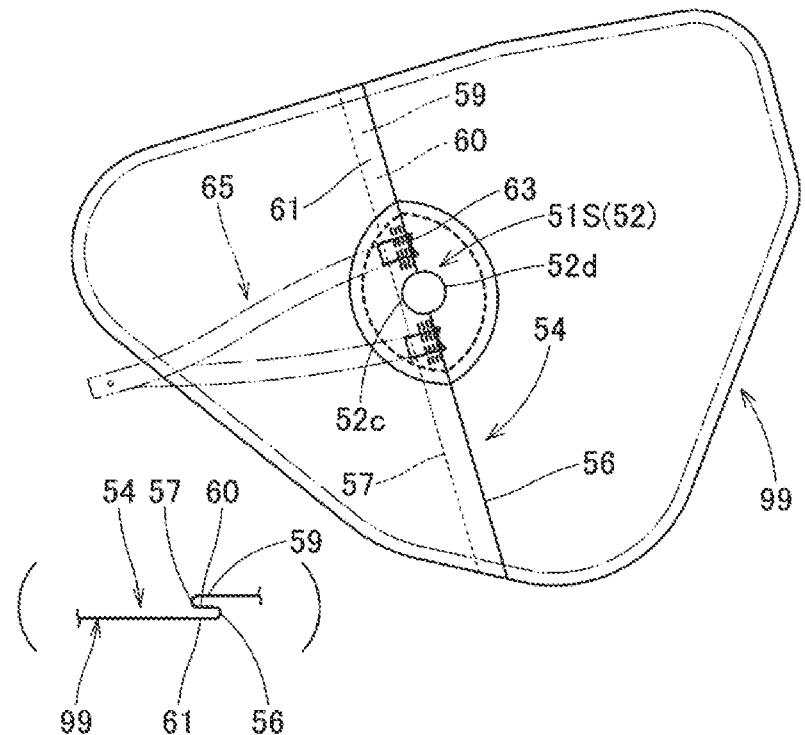
FIGS. 11A and 11B are schematic plan views showing a state where a tack portion is formed on the left panel portion.
Figure 11B:
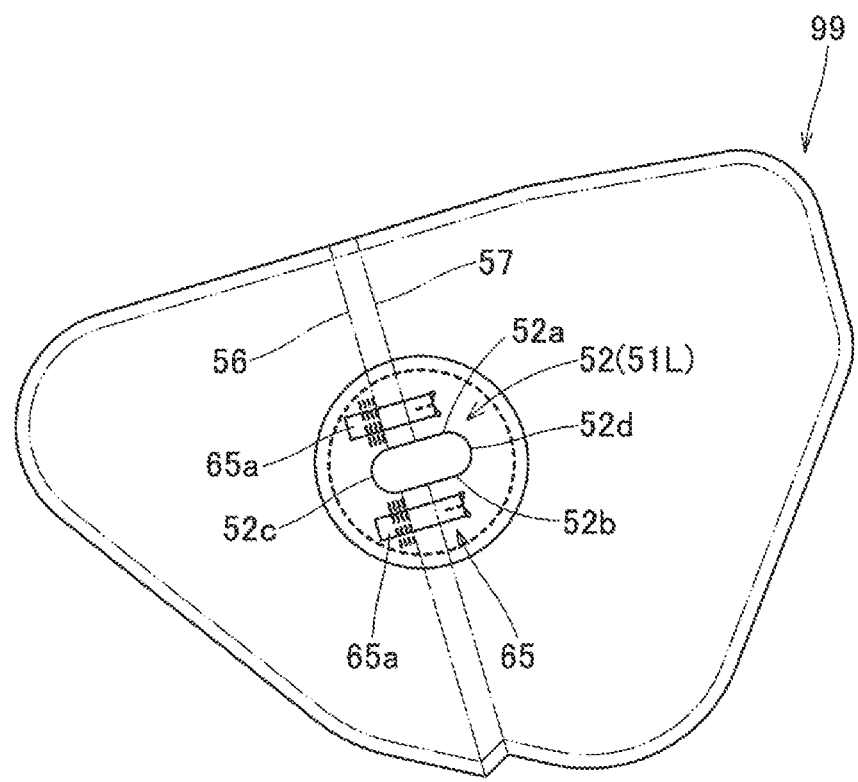
Figure 14A:
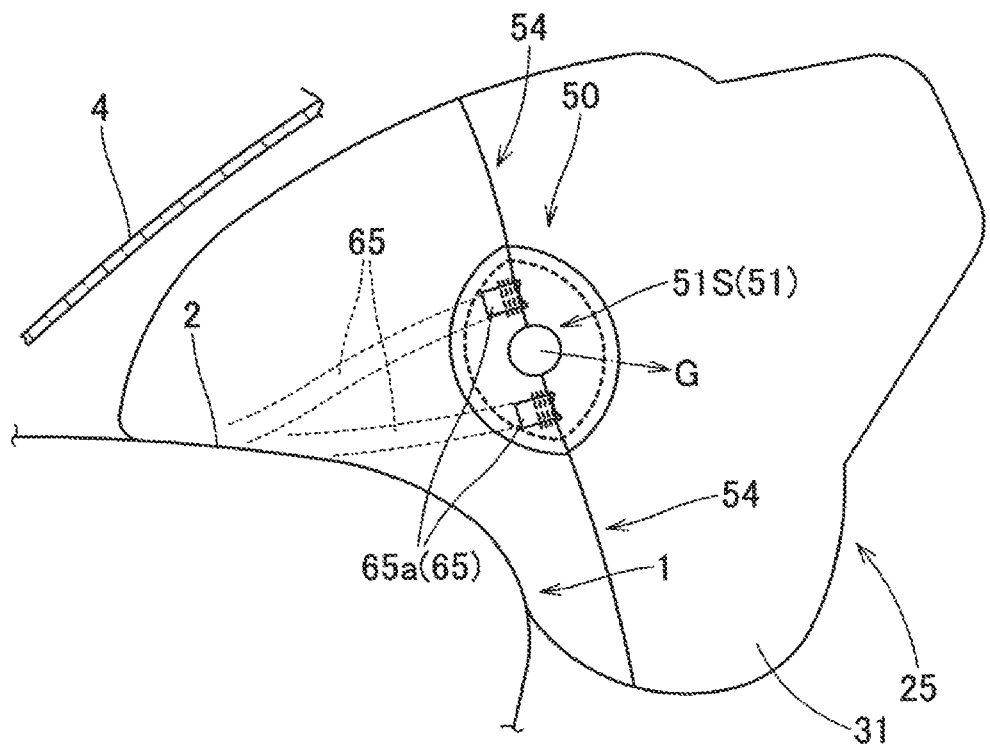
FIGS. 14A and 14B are schematic sectional views of the airbag when the inflation is completed in the airbag device according to the embodiment, and show a state in the closed mode and a state in the open mode.

In the case of the embodiment, when the airbag 25 is completely inflated in a state where the tip end 65b side of the regulating belt portion 65 is locked to the locking member 16, the tack portion 54 is disposed on the left wall portion 31 so as to extend substantially along the upper-lower direction over substantially the entire upper-lower area (see FIGS. 3 and 14A). As shown in FIGS. 11A and 11b, the tack portion 54 is formed by folding the left panel portion 99 by an outer fold 56 and an inner fold 57 formed substantially in parallel such that an inner region 59, an intermediate region 60, and an outer region 61 from the inner peripheral side of the airbag 25 are sequentially stacked, and in the case of the embodiment, the outer fold 56 and the inner fold 57 forming the tack portion 54 are formed over the entire length of the left panel portion 99, and are formed to be substantially orthogonal to the opening forming portion 52 (specifically, the upper edge 52a and the lower edge 52h of the opening forming portion 52) (see FIG. 10). Specifically, when the left panel portion 99 is in the flatly unfolded state, the outer fold 56, which is to be disposed on the outer peripheral surface side when the inflation of the airbag 25 is completed, is located near the front end of the opening forming portion 52 and formed at a position behind the front edge 52c of the forming portion 52, and the inner fold 57, which is to be disposed on the inner peripheral surface side when the inflation of the airbag 25 is completed, is formed substantially at the center of the opening forming portion 52 in the front-rear direction. In other words, an opening forming portion 42 forming the opening 51 is provided across the inner fold 57 and the outer fold 56.

The tack portion 54 includes an outer region 61 in front of the outer fold 56, an intermediate region 60 between the outer fold 56 and the inner fold 57, and an inner region 59 behind the inner fold 57, and the tack portion 54 is formed by laminating the inner region 59, the intermediate region 60, and the outer region 61 when the outer fold 56 and the inner fold 57 are formed. At the time of forming the tack portion 54 in which the outer fold 56 and the inner fold 57 are formed in the left panel portion 99, the opening portion 51S is in a closed state (small open state) as shown in FIG. 11A, and the opening area is smaller than that of the opening portion 51L (see FIG. 11B) in an open state (large open state, approximately matching an external shape of the opening forming portion 52) in which the left panel portion 99 is in the flatly unfolded state (when the tack portion is not formed). More specifically, the opening area of the opening portion 51S in the closed state (small open state) is made smaller than the opening area of the opening portion 51L in the open state (large open state) which substantially matches an outer shape of the opening forming portion 52 so as to make the front edge 52c and the rear edge 52d of the opening forming portion 52 close to each other (to reduce a width dimension in the front-rear direction) In the case of the embodiment, the tack portion 54 is formed by sewing the folded edge portions together when an upper edge 99a and a lower edge 99b of the left panel portion 99 are connected to a left edge 97c of the front panel portion 97 in a state of forming the outer fold 56 and the inner fold 57 in manufacturing the airbag 25. Further, in the left panel portion 99 (left wall portion 31), on a part near the inner region 59 in a general rear region 31b disposed behind the tack portion 54 (the portion disposed continuously from the inner region 59 in the left panel portion 99), slit-shaped insertion holes 63 into which the respective regulating belt portions 65 can be inserted are formed (see FIG. 10 and FIG. 13A). Specifically, the insertion holes 63 are formed at two locations above and below the opening forming portion 52 at positions near the rear end of the opening forming portion 52 and on the front side of the rear edge 52d of the opening forming portion 52. Further, the insertion holes 63 are formed to be substantially along the outer fold 56 and the inner fold 57 at positions substantially symmetric with the outer fold 56 with the inner fold 57 as a center (positions close to the outer fold 56 when forming the outer fold 56) (see FIGS. 10 to 11B).

The regulating belt portion 65 is formed of a belt-shaped body separate from the bag body 26. In the case of the embodiment, the regulating belt portions 65 are disposed around the opening portion 51 at two locations on both sides of a direction (sides in the upper-lower direction) along the outer fold 56 and the inner fold 57 of the tack portion 54, that is, at two locations on the upper side and the lower side of the opening portion 51 (see FIGS. 11A and 11B). As shown in FIGS. 10 to 11B, a base end 65a side of each regulating belt portion 65 is coupled to an outer region 61 side of the tack portion 54, and the regulating belt portion 65 is disposed to be substantially orthogonal to the outer fold 56 and the inner fold 57. Then, the tip end 65b side inserted into the airbag 25 is coupled to a side (a position on the front side) of the airbag 25 that is further away from a part coupled to the base end 65a in a state where the regulating belt portion 65 is in an inverted state so as to surround the tack portion 54 such that each regulating belt portion 65 is inserted into the insertion hole 63 formed on the rear side of the tack portion 54 on the left wall portion 31. Specifically, the tip end 65b of each regulating belt portion 65 protrudes from the insertion hole 36 formed on the front end 27a side of the body inflation portion 27 in the bag body 26, and is locked to the locking member 16 provided on the case 12. A locking hole 66 capable of making the locking pin 17 of the locking member 16 pass through is formed at the tip end 65b of each regulating belt portion 65. That is, in the embodiment, each regulating belt portion 65 is a part extending from the base end 65a to the insertion hole 63, and an outer peripheral side part 68 disposed on an outer peripheral surface side when the inflation is completed is disposed to be substantially orthogonal to the outer fold 56 and the inner fold 57, an inverted part 69 inserted into the insertion hole 63 is inverted, and a part from the inverted part 69 to the tip end 65b is disposed to extend forward as an inner peripheral side part 70 disposed on the inner peripheral surface side when the inflation is completed (see FIG. 10). Further, in the case of the embodiment, a coupling part 67 that couples the base end 65a side of the regulating belt portion 65 to the outer region 61 is formed in the region on the outer fold 56 side (rear side) of the outer region 61 (see FIG. 11A). The base end 65a of the regulating belt portion 65 is not limited to the outer region 61, and may be coupled to a region (in the left wall portion 31, the general front region 31a disposed on the front side of the outer region 61) near the outer region 61 in the left panel portion 99.

In the embodiment, the two regulating belt portions 65, 65 are formed of a single base material 72 for a belt (see FIG. 9) connected on the tip end 65b side, and the tip end side is locked to the locking member 16 in a state of being double-folded. The length dimension of each regulating belt portion 65 is set to a dimension capable of maintaining the folded state of the tack portion 54 and stably maintaining the closed state of the opening portion 51 (opening portion 51S in small open state) by a tension generated when the airbag 25 is inflatable without hindrance and the inflation thereof is completed, even when the airbag 25 is inflated in a state where the locking pin 17 is inserted into the locking hole 66 and the locking with the locking pin 17 is maintained. In the airbag device M according to the embodiment, when the airbag 25 is inflated in the closed mode in which the locking between the regulating belt portion 65 and the locking member 16 is maintained, the airbag 25 is inflated with the opening portion 51S being in the small open state when the folded state of the tack portion 54 in the discharge portion 50 is maintained (see FIGS. 13A and 14A). Further, when the airbag 25 is inflated in the open mode in which the locking between the regulating belt portion 65 and the locking member 16 is released, the airbag 25 is inflated with the opening portion 51L being in the large open state when the folded state of the tack portion 54 in the discharge portion 50 is released (see FIGS. 13B and 14B).

Figure 5:
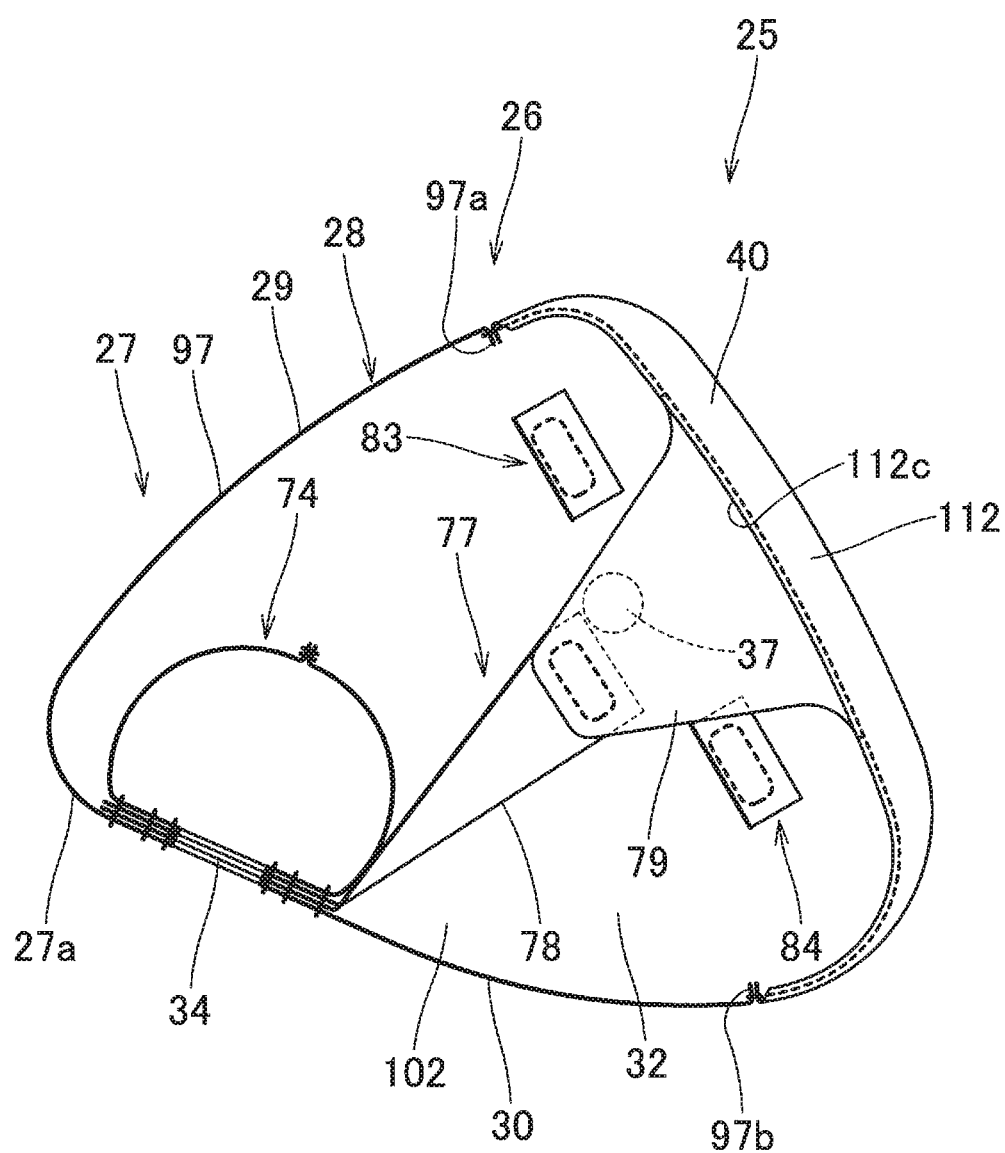
FIG. 5 is a schematic longitudinal sectional view of the airbag in FIG. 3, and a sectional view at a central part of a rear side wall portion in a left-right direction.

As shown in FIG. 5, the rectifying cloth 74 disposed in the bag body 26 covers the upper part of the inflow opening 34 and has a substantially cylindrical shape with left and right sides opened, and is configured to make the inflation gas flowing into the bag body 26 flow from the inflow opening 34 toward the left-right direction temporarily. The rectifying cloth 74 includes a base material 75 for a rectifying cloth shown in FIG. 8.

As shown in FIGS. 5 to 7, as tethers for regulating the inflation completed shape of the bag body 26 in the bag body 26, a front-rear tether 77, left and right tethers 83, 84, and a tether 90 for a recess are provided in the region of the body inflation portion 27 in the case of the embodiment.

The front-rear tether 77 connects the substantially center in the left-right direction of the front collision restraint surface 43 (rear side wall portion 40) and the front end 27a side of the body inflation portion 27, and as shown in FIGS. 5 and 7, the front-rear tether 77 is configured to connect a front part 78 extending from the peripheral edge of the inflow opening 34 to a rear part 79 extending from a rear side wall portion 40 side. The front part 78 is formed by folding a base material 81 for a front part shown in FIG. 8, and the outer shape when the inflation of the bag body 26 is completed is a three-dimensional shape approximating a substantially triangular pyramid shape in which a front end side is substantially along the left-right direction and a rear end side is substantially along the upper-lower direction. The rear part 79 is formed of a substantially trapezoidal sheet body in which a front end side connected to the front part 78 has a narrow width and expands up and down toward a rear end side connected to the rear side wall portion 40, and a rear end side is connected to a position substantially at the center in the upper-lower and left-right directions of the rear side wall portion 40.

When the inflation of the airbag 25 is completed, the front-rear tether 77 connects the approximately center in the left-right direction of the rear side wall portion 40, that is, a substantially center in the left-right direction of the front collision restraining surface 43, to the peripheral edge part of the inflow opening 34 (the front end 27a side of the body inflation portion 27), and the front-rear tether 77 is disposed in order to prevent the front collision restraining surface 43 (rear side wall portion 40) from excessively protruding rearward in an initial inflated stage of the airbag 25, and to prevent the rearward movement of the front collision restraint surface 43 when the inflation in completed. Further, in the embodiment, the rear side wall portion 40 is pulled by the front-rear tether 77, so that when the inflation of the airbag 25 is completed, the substantially center in left-right direction of the rear side wall portion 40 is slightly recessed toward the vehicle front side over substantially the entire upper-lower region (see FIG. 7).

In the case of the embodiment, the left and right tethers 83, 84 are disposed at two locations, that is, above and below the front-rear tether 77 as shown in FIGS. 5 and 6, connect the parts near the rear ends of the left wall portion 31 and the right wall portion 32 respectively, and are provided substantially along the left-right direction when the inflation of the bag body 26 is completed. The left and right tethers 83, 84 are provided in a region behind the discharge portion 50 (tack portion 54). The left and right tethers 83, 84 include two strip-shaped base materials 86L, 86R, 87L, 87R for a tether, respectively (see FIG. 9). The left and right tethers 83, 84 are provided to suppress excessive expansion of the airbag 25 to the left and right in the initial inflated stage and to regulate the width dimension in the left-right direction of the airbag 25 (a separation distance between the left wall portion 31 and the right wall portion 32) when the inflation is completed.

Figure 8:
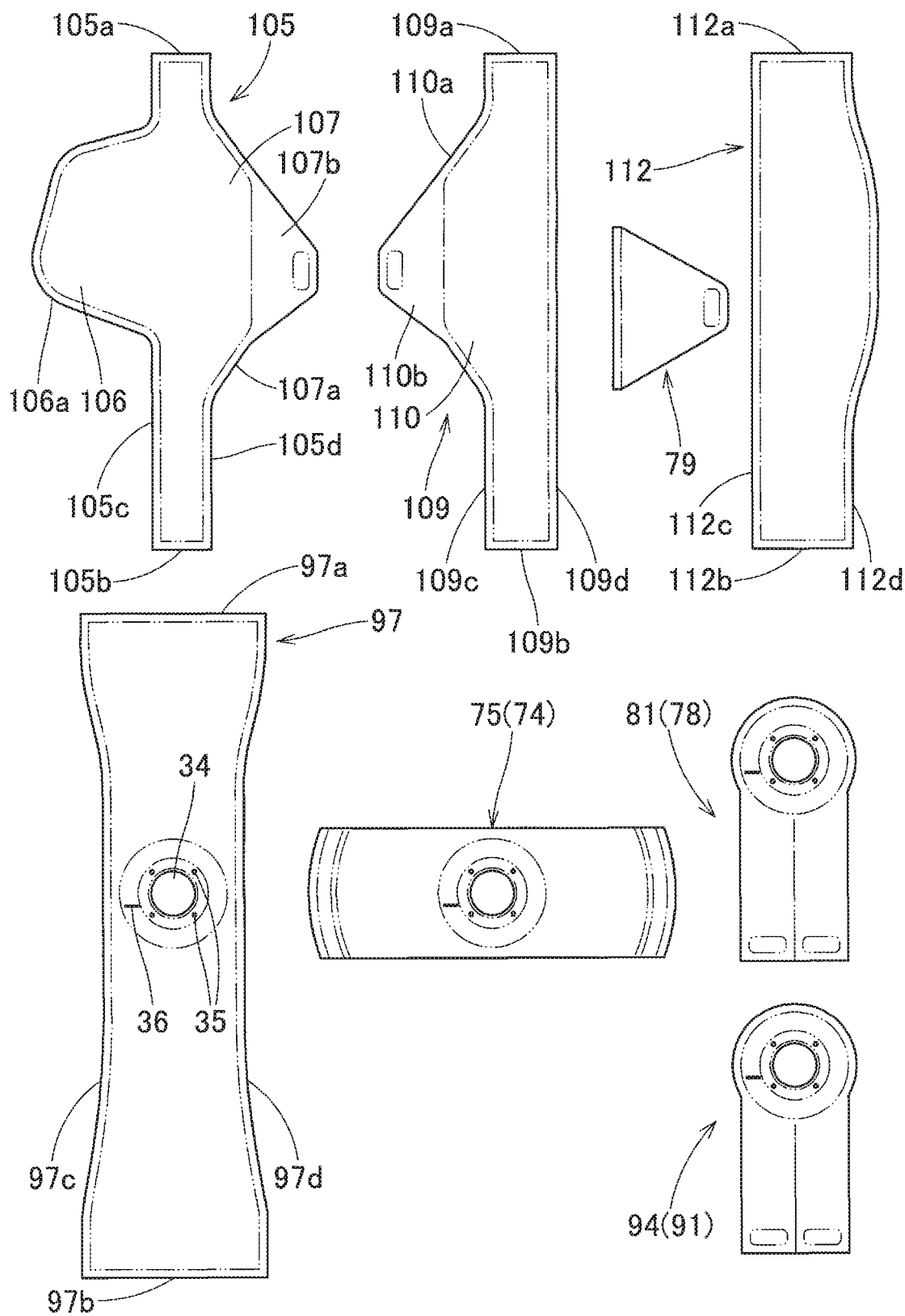
FIG. 8 is a plan view showing base materials forming the airbag in FIG. 3.

As shown in FIG. 7, when the inflation of the airbag 25 is completed, the tether 90 for a recess is configured to connect the recessed tip end (front end 45a) side of the restraining recess 45 to the front end side (front end 27a side of the body inflation portion 27) of the airbag 25. In the case of the embodiment, as shown in FIG. 7, the tether 90 for a recess is configured to connect a front part 91 extending from the peripheral edge of the inflow opening 34 to a rear part 92 extending from the restraining recess 45 side. Similar to the front part 78 in the front-rear tether 77, the front part 91 is formed by folding a base material 94 for a front part as shown in FIG. 8, and the outer shape when the inflation of the bag body 26 is completed is a three-dimensional shape approximating a substantially triangular pyramid shape in which the front end side is substantially along the left-right direction and the rear end side is substantially along the upper-lower direction. The rear part 92 is formed of a substantially trapezoidal sheet body in which a front end side connected to the front part 91 has a narrow width and expands up and down toward a rear end side connected to the restraining recess 45, and the rear end side is connected to a front end side of the restraining recess 45. In the case of the embodiment, the rear part 92 includes extending portions 107b, 110b formed to extend from parts 107, 110 for a recess formed in a rear left panel portion 105 and a rear center panel portion 109 respectively, which will be described below (see FIGS. 6 and 8). The tether 90 for a recess is inclined with respect to the front-rear direction such that a front end 90a side is located at the right side and a rear end 90*b* side is located at the left side when the inflation of the airbag 25 is completed (see FIG. 7). The tether 90 for a recess is set to such a length dimension that the restraining recess 45 can be pulled substantially forward along the tether 90 for a recess when the inflation of the airbag 25 is completed.

Figure 9:
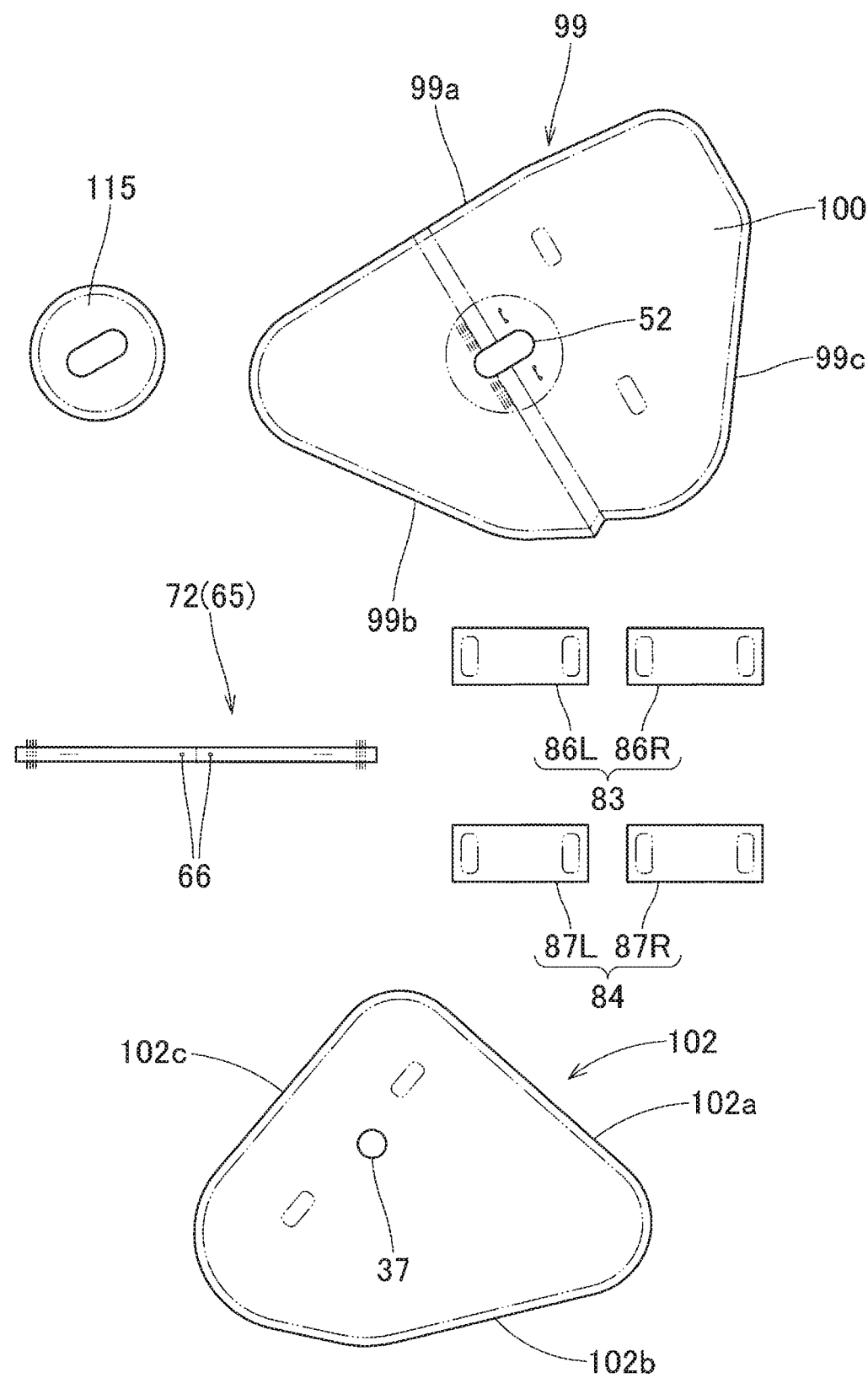
FIG. 9 is a plan view showing the rest of the base materials forming the airbag in FIG. 3.

The bag body 26 is formed in a bag shape by coupling peripheral edges of a base cloth having a predetermined shape to each other, and in the case of the embodiment, includes a left panel portion 99, a right panel portion 102, a front panel portion 97, a rear left panel portion 105, a rear center panel portion 109, and a rear right panel portion 112 as shown in FIGS. 8 and 9.

The front panel portion 97 has an outer shape of a substantially strip shape with a longitudinal direction substantially along the front-rear direction, and is configured such that a front end side and a rear end side in a flatly unfolded state are widened toward end edge sides (rear upper edge 97*a*, rear lower edge 97*b*), respectively. The front panel portion 97 is configured to extend from the upper wall portion 29 to the lower wall portion 30 that face each other in the upper-lower direction in the body inflation portion 27 when the inflation is completed. In the case of the embodiment, the front panel portion 97 is symmetrical.

The left panel portion 99 is configured to extend from the left wall portion 31 to the left wall portion 41*a* of the protruding inflation portion 41 in the body inflation portion 27 when the inflation is completed, and a region on a rear end side thereof is a protruding portion forming portion 100 that forms the left wall portion 41*a* of the protruding inflation portion 41. In the case of the embodiment, a rear edge 99*c* of the left panel portion 99 is formed such that a lower region thereof is gently inclined from the lower edge 99*b*. At a position slightly in front of the center in the front-rear direction and substantially at the center in the upper-lower direction of the left panel portion 99, as described above, the opening forming portion 52 that forms the opening portion 51 of the discharge portion 50 is formed in an oval shape substantially along the front-rear direction. The left panel portion 99 is configured such that, when the tack portion 54 is formed, the outer shape of the front region excluding the protruding portion forming portion 100 is substantially the same as the right panel portion 102. The right panel portion 102 forms the right wall portion 32 of the body inflation portion 27.

The rear left panel portion 105 is formed in a substantially strip shape that forms a part on the left edge side of the rear side wall portion 40 in the body inflation portion 27 when the inflation is completed, and partially protrude a protruding portion forming portion 106 forming the right wall portion 41*b* of the protruding inflation portion 41 and a part 107 for a recess forming the left wall portion 46 of the restraining recess 45. Specifically, the protruding portion forming portion 106 is formed so as to protrude from a left edge 105*c* of the rear left panel portion 105 in a flatly unfolded state, and the part 107 for a recess is formed so as to protrude from a right edge 105*d*. The extending portion 107*b* forming the rear part 92 of the tether 90 for a recess is disposed on a tip end side of the part 107 for a recess.

The rear center panel portion 109 forms a region on the left side of the center in the left-right direction of the rear side wall portion 40, and is configured as a strip shape whose longitudinal direction is substantially along the upper-lower direction. A part 110 for a recess forming the right wall portion 47 of the restraining recess 45 is formed on a left edge 109*c* of the rear center panel portion 109 so as to protrude. The extending portion 110*b* forming the rear part 92 of the tether 90 for a recess is disposed on a tip end side of the part 110 for a recess. The rear right panel portion 112 forms a region on the right side of the center in the left-right direction of the rear side wall portion 40, and is configured as a strip shape whose longitudinal direction is substantially along the upper-lower direction.

In the airbag 25 according to the embodiment, a substantially circular reinforcing cloth 115 is provided in a peripheral edge region of the opening portion 51 (see FIGS. 3, 9, 14A, and 14B). In the embodiment, the front panel portion 97, the left panel portion 99, the right panel portion 102, the rear left panel portion 105, the rear center panel portion 109, the rear right panel portion 112, the reinforcing cloth 115, the base material 72 for a base, the base material 75 for a rectifying cloth, the front part 78 (base material 81 for a front part) of the front and rear tethers 77, the rear part 79, the front part 91 (base material 94 for a front part) of the tether 90 for a recess, and the base materials 86L, 86R, 87L, 87R for a tether of the left and right tethers 83, 84 forming the bag body 26 are each formed of a flexible woven cloth made of polyester yarn, polyamide yarn, and the like.

As shown in FIGS. 3 to 9, the bag body 26 according to the embodiment is formed in a bag shape having the discharge portion 50 by sewing (coupling) the corresponding edge portions of the front panel portion 97, the left panel portion 99, the right panel portion 102, the rear left panel portion 105, the rear center panel portion 109, and the rear right panel portion 112 using a suture thread.

Specifically, the rear upper edge 97*a* of the front panel portion 97 is coupled to upper edges 105*a*, 109*a*, 112*a* of the rear left panel portion 105, the rear center panel portion 109, and the rear right panel portion 112, and the rear lower edge 97*b* is coupled to lower left edges 105*b*, 109*b*, 112*b* of the rear left panel portion 105, the rear center panel portion 109, and the rear right panel portion 112. The left edge 97*c* of the front panel portion 97 is coupled from the upper edge 99*a* to the lower edge 99*b* of the left panel portion 99, and the right edge 97*d* is coupled from the upper edge 102*a* to the lower edge 102*b* of the right panel portion 102. The rear edge 99*c* of the left panel portion 99 is coupled to a left edge of the rear left panel portion 105 and an outer edge 106*a* of the protruding portion forming portion 106. A rear edge of the right panel portion 102 is coupled to a right edge 112*d* of the rear right panel portion 112. The right edge 105*d* of the rear left panel portion 105 is coupled to the left edge 109*c* of the rear center panel portion 109, and at this time, outer edges 107*a*, 110*a* of the parts 107, 110 for a recess are also coupled to each other. A right edge 109*d* of the rear center panel portion 109 is coupled to a left edge 112*c* of the rear right panel portion 112.

Next, mounting of the airbag device M according to the embodiment on the vehicle V will be described. First, the airbag 25 is folded so as to be capable of being stored in the case 12 in a state where the retainer 9 is stored therein, and the folded airbag 25 is wrapped by a breakable wrapping sheet (not shown) for preventing folding collapse. At this time, the tip end 65*b* side of the regulating belt portion 65 extending from the discharge portion 50 protrudes from the insertion hole 36 formed on the bag body 26. Thereafter, the folded airbag 25 is stored in the case 12 to which the locking member 16 has been attached in advance so as to protrude the bolt 9*a* from the bottom wall portion 13. Then, the tip end 65*b* side of the regulating belt portion 65 is locked to the locking member 16 such that the locking pin 17 of the locking member 16 is inserted into the locking hole 66 on the tip end 65*b* side of the regulating belt portion 65 protruding from the through hole 13*b* formed on the bottom wall portion 13 and the tip end of the locking pin 17 is supported by the support bracket 19. Next, the body portion 8a of the inflator 8 is inserted into the case 12 from below the bottom wall portion 13, and the bolts 9a of the retainer 9 protruding downward from the bottom wall portion 13 are inserted through the flange portion 8c of the inflator 8. Thereafter, if the nut 10 is fastened to each bolt 9a protruding from the flange portion 8c of the inflator 8, the folded airbag 25 and the inflator 8 can be attached to the case 12.

Then, the airbag device M can be mounted on the vehicle by locking the peripheral wall portion 14 of the case 12 to the connecting wall portion 6c of the airbag cover 6 in the instrument panel 1 mounted on the vehicle V, fixing a bracket (not shown) provided in the case 12 to the body side of the vehicle V, and electrically connecting the inflator 8 and the locking member 16 to the control device 120.

In the airbag device M according to the embodiment, if the frontal collision, the oblique collision, or the offset collision of the vehicle V is detected when the airbag M is mounted on the vehicle V, the control device 120 outputs the operation signal to the inflator 8, the inflator 8 discharges the inflation gas from the gas discharge ports 8b, and the airbag 25 is inflated by making the inflation gas flow therein, and pushes to open the door portions 6a, 6b of the airbag cover 6. Then, the airbag 25 protrudes upward from the case 12 through an opening formed by pushing to open the door portions 6a, 6b of the airbag cover 6, and unfolds and inflates while protruding toward a rear side of the vehicle V. As shown by a two-dot chain line in FIG. 1 and FIGS. 12 and 14, the airbag 25 is completely inflated so as to fill the space between the upper surface 2 of the instrument panel 1 and the windshield 4 above the instrument panel 1.

Figure 13A:
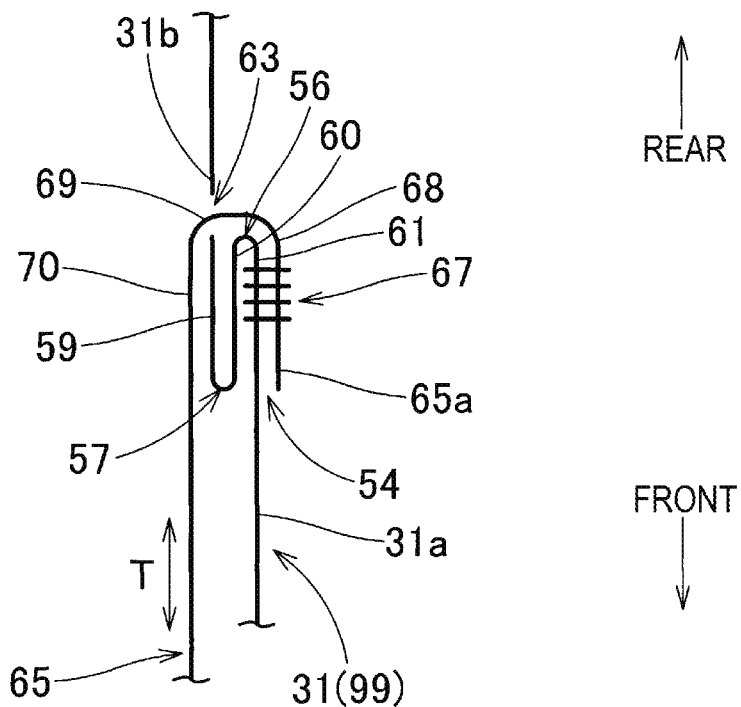
FIGS. 13A and 13B are schematic sectional views of a part of a discharge portion of the airbag when the inflation is completed in the airbag device according to the embodiment, and show a state in a closed mode and a state in an open mode.
Figure 13B:
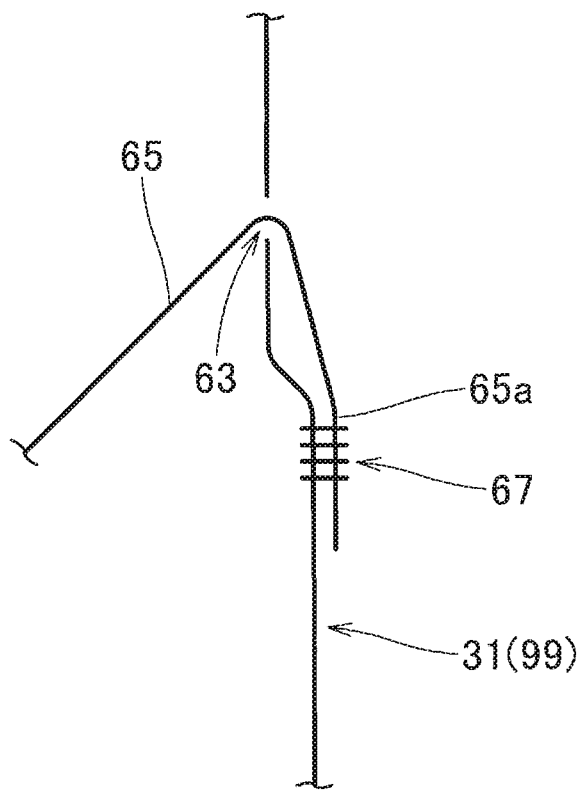
Figure 16:
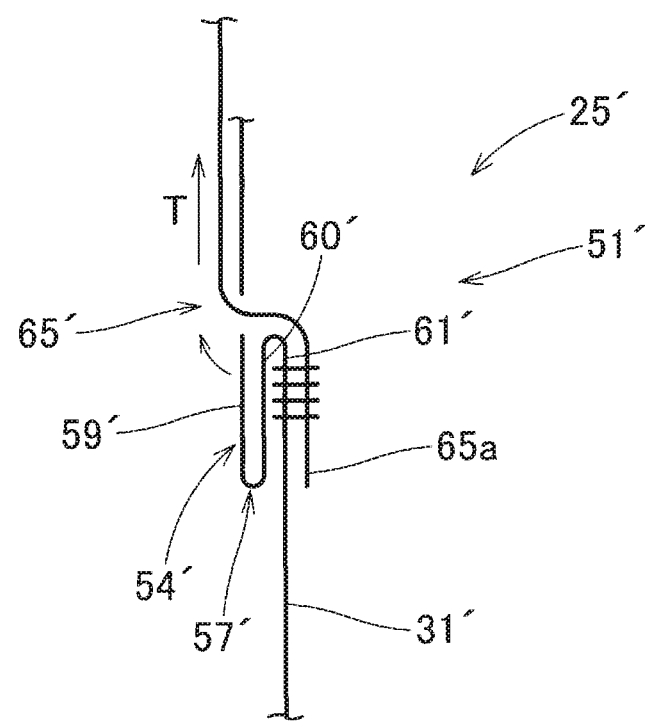
FIG. 16 is a schematic sectional view of a part of a discharge portion when the inflation is completed in an airbag according to a comparative example.

In the airbag device M according to the embodiment, in the discharge portion 50, as shown in FIG. 13A, since the regulating belt portion 65 having the base end 65a side coupled to the outer surface side of the airbag 25 (the body inflation portion 27) is in the inverted state so as to surround the periphery of the tack portion 54 provided around the opening portion 41, and the tip end 65b side inserted into the airbag 25 is connected to the airbag 25 side, when the inflation of the airbag 25 is completed, the regulating belt portion 65 is disposed so as to generate tension T toward a direction side in which the folding of the inner fold 57 is not unfolded, and the folded state of the tack portion 54 can be maintained by the regulating belt portion 65. Specifically, in the airbag device according to the embodiment, by the regulating belt portion 65 disposed so as to generate the tension T toward the direction side in which the folding of the inner fold 57 is not unfolded when the inflation of the airbag 25 is completed, it is difficult to unfold the fold of the inside fold 57, the inner region 59 and the intermediate region 60 in the tack portion 54 can be brought into smoothly close contact with the outer region 61 by receiving the internal pressure of the inflation gas flowing into the airbag 25, and thus the folded state of the tack portion 54 forming the discharge portion 50 can be maintained, and good sealing properties can be ensured. Therefore, as shown in FIG. 14A, the closed state (small open state) of the opening portion 51 can be stably maintained, and a predetermined internal pressure of the airbag 25 at the time of inflation can be stably ensured. Incidentally, a related-art airbag 25' having a configuration in which a tip end side of a regulating belt portion 65' is disposed to be separated from a base portion 65a side and a tack portion 54' is described as a comparative example in FIG. 16. In the airbag 25' having such a configuration, when the tension T is generated in the regulating belt portion 65' at the time of completion of the inflation, the regulating belt portion 65' behaves in a manner of pulling inward a part of an inner fold 57' disposed on an inner peripheral surface side of the airbag 25' in the tack portion 54' so as to separate the part of the inner fold 57' from an outer region 61'. Therefore, even if the tack portion 54' receives the internal pressure of the inflation gas flowing inside, an inner region 59' and an intermediate region 60' are pulled by the regulating belt portion 65' and behave as if the inner region 59' and the intermediate region 60' are peeled off from an outer region 61' disposed on an outer peripheral surface side, and the opening portion 51' cannot be stably closed by the tack portion 54'. In the airbag device M according to the embodiment, when the tension of the regulation belt portion 65 is not applied, the airbag device M receives a pressing force of the inflation gas flowing into the airbag 25, the folded state of the tack portion 54 due to the outer fold 56 and the inner fold 57 is quickly released (see FIG. 13B), the opening portion 51 is in an open state (large open state) (see FIG. 14B), and the inflation gas is stably exhausted.

Therefore, in the airbag device M according to the embodiment, the internal pressure of the airbag 25 at the time of completion of the inflation can be accurately controlled by the discharge portion 50.

In the airbag device M according to the embodiment, since the regulating belt portions 65 are provided around the opening portion 51 at two locations on both sides of the direction along the outer fold 56 and the inner fold 57 of the tack portion 54, that is, two locations on the upper side and lower side of the opening portion 51 in the case of the embodiment, when the inflation of the airbag 25 is completed, the folded state due to the outer fold 56 and the inner fold 57 of the tack portion 54 can be more stably maintained by the two regulating belt portions 65. If such a point is not taken into consideration, the regulating belt portion may be disposed at only one location.

Further, in the airbag device M according to the embodiment, the opening forming portion 52 forming the opening portion 51 is provided across the inner fold 57 and the outer fold 56, and as shown in FIG. 14A, the opening portion 51 has an opening as the small open state even in the closed state. Therefore, in the airbag device M according to the embodiment, the opening portion 51S can also be used as a vent hole for exhausting excess inflation gas flowing inside by being opened even in the closed state, and a vent hole may not be separately provided. In the embodiment, the opening portion 51S in the small open state has an opening area set to be substantially the same as the vent hole 37 provided in the right wall portion 32, and is configured to exhaust excess inflation gas in the closed state. It goes without saying that if such points are not taken into consideration, the opening portion of the airbag may be configured to be brought into the closed state in the closed state and a separate vent hole may be provided.

Further, in the airbag device M according to the embodiment, the tip end 65b side of the regulating belt portion 65 is locked to the locking member 16 disposed on the case 12 side in a state of protruding outside the airbag 25, and the locking member 16 is configured to be capable of releasing the locked state of the tip end portion 65b side of the regulating belt portion 65 by operating the actuator 18. Therefore, operating time of transiting the opening portion 51 to the open state can be made substantially constant by operating the actuator 18, so that the protection performance of the airbag 25 is unlikely to vary, and the occupant MP can be stably protected.

Figure 14B:
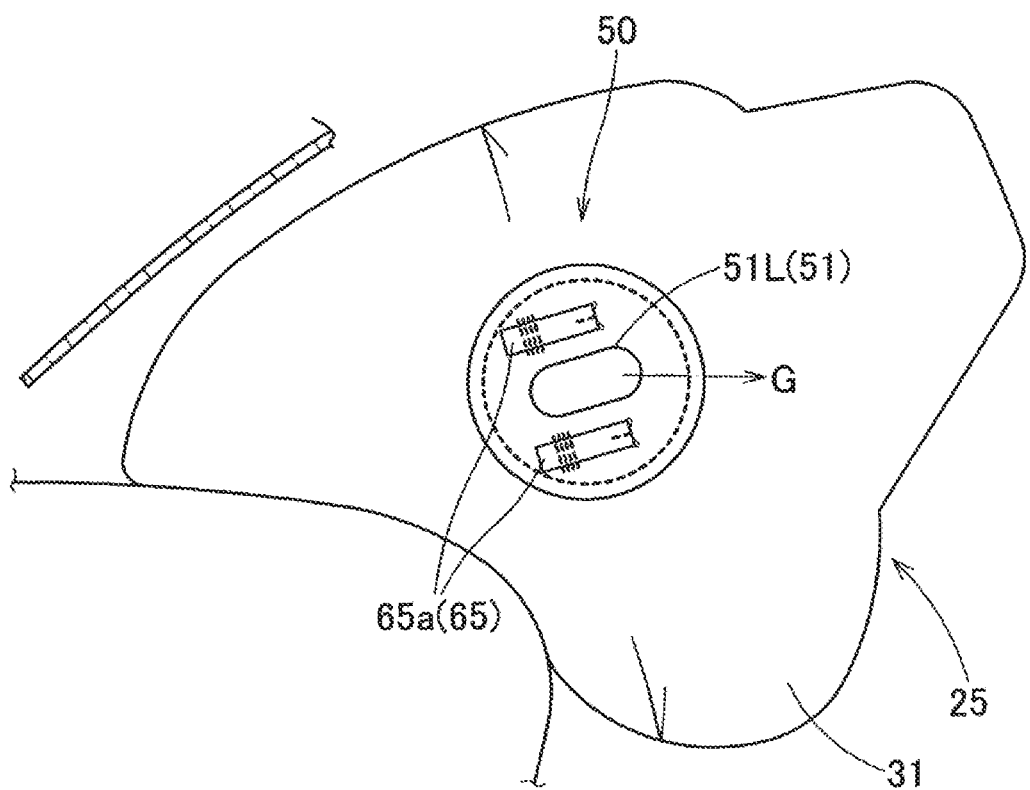

Specifically, in the airbag device M according to the embodiment, the actuator 18 of the locking member 16 that locks the tip end 65*b* side of the regulating belt portion 65 extending from the discharge portion 50 is controlled in operation by the control device 120. In a case where the control device 120 that inputs signals from the predetermined sensors 121, 122, and 123 detects, for example, the sitting of a small-sized occupant MP1 or the sitting of the occupant MP at a position close to the instrument panel 1, the control device 120 outputs an operation signal to the actuator 18 of the locking member 16 at substantially the same time as the operation of the inflator 8, and the locking member 16 is operated to pull in the locking pin 17. Then, as shown in FIG. 14B, the folded state of the tack portion 54 is released, and the airbag 25 is inflated in the open mode in which the opening portion 51L is brought into the large open state, and the inflation is completed by exhausting excess inflation gas G from the opening portion 51L in the large open state. Therefore, since the airbag 25 exhausts the excess inflation gas G from the opening portion 51L and completes the inflation in a state where an increase in the internal pressure is suppressed, the airbag 25 whose internal pressure is set to be low can suppress overly pressing the small-sized occupant MP1 and the occupant MP sitting close to the instrument panel 1, thereby softly protecting the small-sized occupant MP1 and the occupant MP.

On the contrary, when the control device 120, for example, detects that a large-sized occupant MP2 sits or that the occupant MP sits at a position away from the instrument panel 1, the operation signal is not output from the control device 120 to the actuator 18, the airbag 25 is inflated in a closed mode in which the opening portion 51S is brought into the small open state while the folded state of the tack portion 54 is maintained by the tension generated in the regulating belt portion 65, and the small open state is maintained until the inflation is completed as shown in FIG. 14A. The opening portion 51S in the small open state acts as a vent hole normally provided in the airbag, and the exhaust amount of the inflation gas is suppressed. Thus, the airbag 25 completes the inflation in a state where the internal pressure is high, and ensures a sufficient internal pressure for the large-sized occupant MP2 and the occupant MP who sits away from the instrument panel 1, and the airbag 25 that has been inflated with good cushioning properties can be properly protected without bottoming.

Figure 15A:
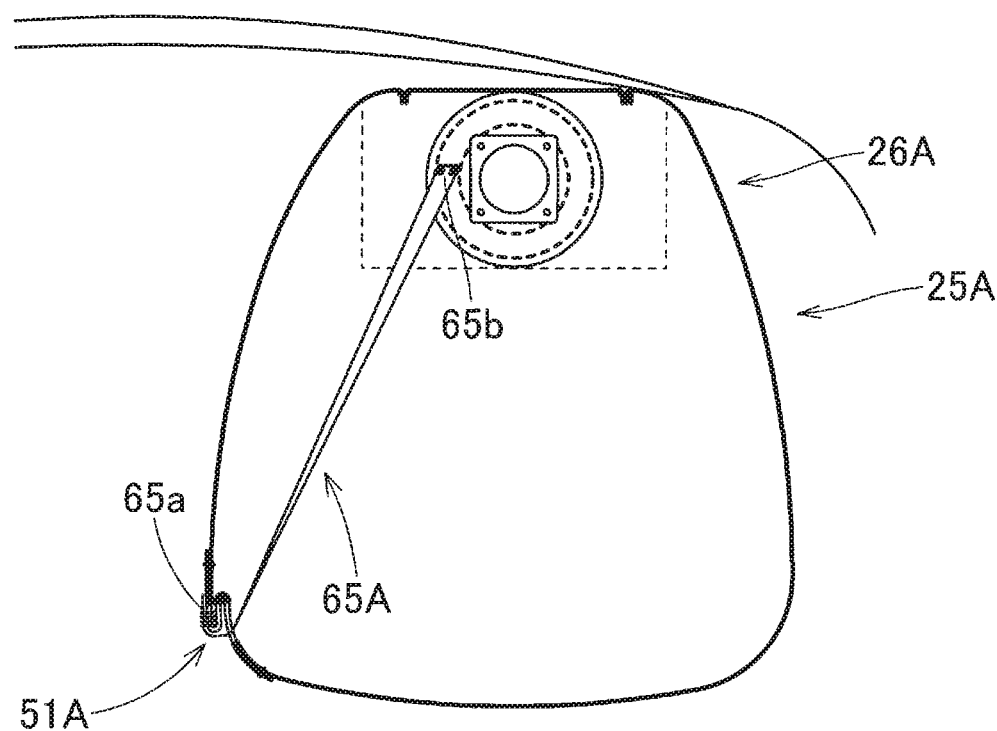
FIGS. 15A and 15B are schematic cross-sectional views of an airbag according to another embodiment of the present invention, and show a state in the closed mode and a state in the open mode.
Figure 15B:
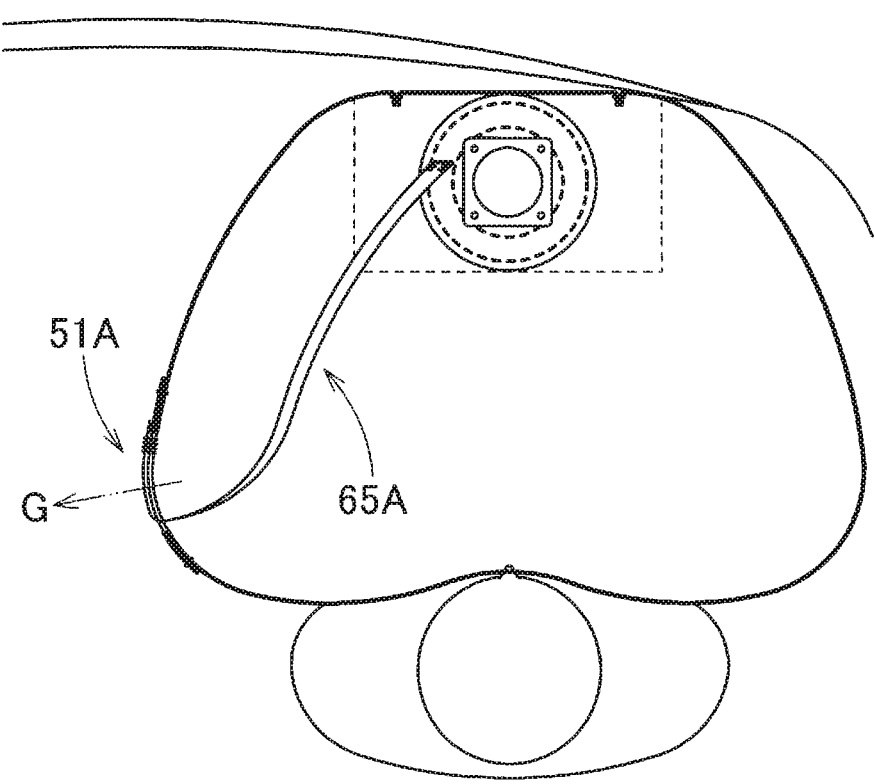

Note that the tip end of the regulating belt portion does not need to be locked to the locking member, and for example, like an airbag 25A shown in FIGS. 15A and 15B, the tip end 65*b* of a regulating belt portion 65A extending from a discharge portion 50A is connected (sewing) to a position on the inner peripheral surface side of the bag body 26A that is further away from the part where the base end 65*a* is connected (front side in the case of the embodiment), and when the occupant MP is received by a front collision restraint surface 43A at the time of completion of the inflation, the regulating belt portion 65A may be able to be loosened as shown in FIG. 15B. Specifically, in the airbag 25A, when the discharge portion 50A for discharging the inflation gas is disposed near the rear end of a left wall portion 31A, and the occupant is received by a front collision restraint surface 43A, with the front collision restraint surface 43A moving forward, the left wall portion 31A bends so as to reduce the width dimension in the front-rear direction, the regulating belt portion 65A is loosened due to the bending of the left wall portion 31A, and the opening portion of the discharge portion 50A is brought into the open state, so that excess inflation gas is exhausted.

Further, in the airbag device according to the embodiment, since the outer fold 56 and the inner fold 57 forming the tack portion 54 are formed so as to extend toward outer peripheral edge sides (an upper edge 99*a* side and a lower edge 99*b* side) of the left panel portion 99 as the base material forming the airbag 25, the outer shape of the tack portion 54 can be stabilized as compared with the case where the tack portion is partially provided on the base material. It goes without saying if such a point is not taken into consideration, the tack portion may not be provided over the entire region of the left panel portion (left wall portion).

In the embodiment, the airbag device for a passenger seat is adopted as an example and described, but the airbag device to which the present invention can be applied is not limited to the airbag device for a passenger. For example, the present invention is also applicable to an airbag device for a steering wheel disposed in front of a driver as an occupant, an airbag device disposed in front of an occupant sitting in a rear seat, and the like.

According to an aspect of the invention, there is provided an airbag device comprising: an airbag folded and stored in a storage part, configured to inflate so as to protrude from the storage part by allowing inflation gas to flow inside, the airbag formed with a discharge portion capable of discharging a part of the inflation gas flowing into the airbag, wherein the discharge portion includes: an opening portion formed by cutting out a base material forming the airbag; a tack portion provided on the base material around the opening portion; and a regulating belt portion separated from the airbag and disposed on a peripheral edge of the opening portion to regulate opening and closing of the opening portion, the tack portion is formed by making a fold on the base material from a state where the base material is flatly unfolded so as to reduce an opening area of an opening on the opening portion, the tack portion is formed by folding the base material by an outer fold and an inner fold that which are formed substantially in parallel, such that an inner region, an intermediate region, and an outer region are stacked, a base end side of the regulating belt portion is coupled to an outer region side, the regulating belt portion is disposed to be substantially orthogonal to the outer fold and the inner fold, and a tip end side inserted into the airbag is connected to a side of the airbag which is further away from a part coupled to the base end in a state where the regulating belt portion is in an inverted state so as to surround the tack portion such that the regulating belt portion is inserted into an insertion hole formed on a part of the base material disposed continuously from the inner region, and when the inflation of the airbag is completed, the tack portion is maintained in a folded state by the regulating belt portion due to tension acting on the regulation belt portion, so that a closed state of the opening portion is capable of being maintained, and when the tension does not act on the regulating belt portion, the folded state is released and the opening portion is brought into an open state.

In the airbag device according to the present invention, in the discharge portion, since the regulating belt portion having the base end side coupled to the outer surface side of the airbag is in the inverted state so as to surround the periphery of a tack portion provided around the opening portion, and the tip end side inserted into the airbag is connected to the airbag side, when the inflation of the airbag is completed, the regulating belt portion is disposed so as to generate tension toward a direction side in which the folding of the inner fold is not unfolded, and the folded state of the tack portion can be maintained by the regulating belt portion. Specifically, in the airbag device according to the present invention, by the regulating belt portion disposed so as to generate the tension toward the direction side in which the folding of the inner fold is not unfolded when the inflation of the airbag is completed, it is difficult to unfold the fold of the inside fold, the inner region and the intermediate region in the tack portion can be brought into smoothly close contact with the outer region by receiving the internal pressure of the inflation gas flowing into the airbag, and thus the folded state of the tack portion forming the discharge portion can be maintained, and good sealing properties can be ensured. Therefore, the closed state of the opening portion can be stably maintained, and a predetermined internal pressure of the airbag at the time of inflation can be stably ensured. Further, in the airbag device according to the present invention, when the tension of the regulation belt portion is not applied, the airbag device receives a pressing force of the inflation gas flowing into the airbag, the folded state of the tack portion due to the outer fold and the inner fold is quickly released, the opening portion is in an open state, and the inflation gas is stably exhausted.

Therefore, in the airbag device according to the embodiment, the internal pressure of the airbag when the inflation is completed can be accurately controlled by the discharge portion.

In the airbag device according to the present invention, if the regulating belt portions are provided around the opening portion at two locations on both sides of the direction along the fold of the tack portion, when the inflation of the airbag is completed, it is preferable that the folded state due to the outer fold and the inner fold of the tack portion can be more stably maintained by the two regulating belt portions.

Further, in the airbag device according to the present invention, if the opening portion is provided across the inner fold and the outer fold and has an opening even when the opening portion is in the closed state, it is preferable that the opening portion can also be used as a vent hole for exhausting excess inflation gas flowing inside by being opened even in the closed state, and a vent hole may not be separately provided.

Further, in the airbag device with the above configuration, it is preferable that the tip end side of the regulating belt portion is locked to a locking member disposed on a storage part side in a state of protruding outside the airbag, and the locking member is configured to be capable of releasing the locked state of the tip end side of the regulating belt portion by operating an actuator.

If the airbag device has such a configuration, operating timing of transiting the opening portion to the open state can be made substantially constant by operating the actuator, so that the protection performance of the airbag is unlikely to vary, and the occupant can be stably protected.

Further, in the airbag with the above configuration, the regulating belt portion may be configured such that the opening portion is brought into the open state when the occupant is received by the airbag whose inflation is completed.

Further, in the airbag device with the above configuration, if the outer fold and the inner fold forming the tack portion are formed so as to extend toward outer peripheral edge sides of the base material forming the airbag, the outer shape of the tack portion can be stabilized as compared with the case where the tack portion is partially provided on the base material.

The invention claimed is:

1. An airbag device comprising: an airbag folded and stored in a storage part, configured to inflate so as to protrude from the storage part by allowing inflation gas to flow inside, the airbag formed with a discharge portion capable of discharging a part of the inflation gas flowing into the airbag, wherein the discharge portion includes: an opening portion formed by cutting out a base material forming the airbag; a tack portion provided on the base material around the opening portion; and a regulating belt portion separated from the airbag and disposed on a peripheral edge of the opening portion to regulate opening and closing of the opening portion, the tack portion is formed by making a fold on the base material from a state where the base material is flatly unfolded so as to reduce an opening area of an opening on the opening portion, the tack portion is further formed by folding the base material by an outer fold and an inner fold that which are formed substantially in parallel; such that an inner region; an intermediate region; and an outer region are stacked, a base end side of the regulating belt portion is coupled to an outer region side, the regulating belt portion is disposed to be substantially orthogonal to the outer fold and the inner fold, and a tip end side inserted into the airbag is connected to a side of the airbag which is further away from a part coupled to the base end in a state where the regulating belt portion is in an inverted state so as to surround the tack portion such that the regulating belt portion is inserted into an insertion hole formed on a part of the base material disposed continuously from the inner region, and when the inflation of the airbag is completed, the tack portion is maintained in a folded state by the regulating belt portion due to tension acting on the regulation belt portion, so that a closed state of the opening portion is capable of being maintained, and when the tension does not act on the regulating belt portion, the folded state is released and the opening portion is brought into an open state.

2. The airbag device according to claim 1, wherein
the regulating belt portion includes regulating belt portions which are provided around the opening portion, and at two locations on both sides of a direction along the fold of the tack portion.

3. The airbag device according to claim 1, wherein
the opening portion is provided across the inner fold and the outer fold and has an opening even when the opening portion is in the closed state.

4. The airbag device according to claim 1, wherein
the tip end side of the regulating belt portion is locked to a locking member disposed on a storage part side in a state of protruding outside the airbag, and
the locking member is configured to be capable of releasing a locked state of the tip end side of the regulating belt portion by operating an actuator.

5. The airbag device according to claim 1, wherein
the regulating belt portion is configured to bring the opening portion into the open state when the occupant is received by the airbag that is completely inflated.

6. The airbag device according to claim 1, wherein
the outer fold and the inner fold forming the tack portion are formed so as to extend toward an outer peripheral edge of the base material forming the airbag.

* * * * *